United States Patent [19]

Asada et al.

[11] Patent Number: 5,203,234
[45] Date of Patent: Apr. 20, 1993

[54] AUTOMATIC TRANSMISSION

[75] Inventors: Toshiyuki Asada, Susono; Yasuo Hojo; Hideo Tomomatsu, both of Nagoya, all of Japan

[73] Assignee: Toyota Jidosha Kabushiki Kaisha, Toyota, Japan

[21] Appl. No.: 611,924

[22] Filed: Nov. 13, 1990

[30] Foreign Application Priority Data

Nov. 13, 1989 [JP] Japan .................................. 1-295823
Nov. 30, 1989 [JP] Japan .................................. 1-309028
Jan. 19, 1990 [JP] Japan .................................. 2-10110

[51] Int. Cl.$^5$ .............................................. B60K 41/06
[52] U.S. Cl. ..................................... 74/866; 475/278; 475/284
[58] Field of Search .................. 74/866; 475/277, 278, 475/284

[56] References Cited

U.S. PATENT DOCUMENTS

| 4,733,580 | 3/1988 | Kubo et al. ........................... 74/866 |
| 4,742,733 | 5/1988 | Schreiner .............................. 74/866 |
| 4,793,216 | 12/1988 | Hiramatsu et al. .................... 74/866 |
| 4,823,643 | 4/1989 | Koshizawa ............................ 74/866 |
| 4,963,124 | 10/1990 | Takahashi et al. ............. 475/277 X |
| 4,989,477 | 2/1991 | Hunter et al. ......................... 74/866 |
| 5,007,887 | 4/1991 | Asada .................................. 475/284 |
| 5,030,187 | 7/1991 | Asada ............................. 475/285 X |

FOREIGN PATENT DOCUMENTS 60-57036  4/1985  Japan .
61-58697 12/1986  Japan .
1-224552  9/1989  Japan .

Primary Examiner—Richard M. Lorence
Assistant Examiner—Benjamin Levi
Attorney, Agent, or Firm—Oblon, Spivak, McClelland, Maier & Neustadt

[57] ABSTRACT

An automatic transmission which includes a device for selecting and temporarily setting such one of other speed stages, if any, between a present speed stage and a target speed stage as can have a small number of fluctuating revolutions of rotary members of planetary gear sets of the automatic transmission and two or less frictional engagement elements to be switched.

21 Claims, 13 Drawing Sheets

AUTOMATIC TRANSMISSION

BACKGROUND OF THE INVENTION

The present invention relates to an automatic transmission and, more particularly, to an automatic transmission capable of temporarily setting a speed stage other than that which is determined on the basis of the running conditions.

An automatic transmission to be mounted on a vehicle such as an automobile is ordinarily geared at present to change the speed stages stepwise. As is also known in the art, the ordinary automatic transmission mounted on an automobile is constructed to change the transmission passage of a drive force through a gear train by a plurality of frictional engagement means including clutch means and brake means thereby to set one of plural speed stages. In recent years, moreover, the number of speed stages to be set is increased to improve the power performance, to reduce the noises of a high-speed run and/or to improve the fuel consumption. In Japanese Patent Laid-Open No.60-57036, for example, there is proposed a transmission which is enabled to set not only the forward five and one reverse stages but also the so-called "2.5th speed" or "3.5th speed". On the other hand, the shifts of the automatic transmission are ordinarily controlled by using the engine load represented by the degree of throttle opening, the running speed and the engine r.p.m. as control parameters. In case of the stepwise shifts, however, the output torque has to be stepwise changed so that shocks are inevitably generated in accordance with a shift. It has been an important requisite to reduce the noises, for which a variety of trials have been made in the art.

In Japanese Patent Publication No. 61-58697, for example, there has been proposed a system, in which a shift has been stepwise executed by using a timer in case it is determined to jump two steps or more by a control unit on the basis of the throttle opening or the running speed. In Japanese Patent Laid-Open Hei 1-224552, on the other hand, there has been proposed a system, in which a shift is executed by way of an intermediate speed stage having an intermediate one between two adjacent speed stages.

If the number of speed stages to be set is increased, as in an automatic transmission disclosed in Japanese Patent Laid-Open No. 60-57036, the range between the maximum gear ratio and the minimum gear ratio is widened to improve the power performance and the fuel consumption. If, on the other hand, the gear ratios of the individual speed stages are given close values, the torque fluctuations are reduced in case of the stepwise shift to take an advantage for damping the shift shocks. However, the existing vehicular automatic transmission has a restriction upon its gear ratios to be set. If, therefore, the number of gear ratios to be set is increased within the restricted range, two or more speed stages are frequently jumped in the actual run. In this case, it is conceivable to execute the shift via the aforementioned intermediate speed stage. In case of the so-called "jump shift" from the 1st to 5th speeds in the automatic transmission disclosed in Japanese Patent Laid-Open No. 60-57036, the direction of changing the number of revolutions of any rotary member of planetary gear sets composing the gear train is reversed if the shift is executed through their intermediate 2nd, 3rd or 4th speed. As a result, the shift shocks may possibly be deteriorated because the kinetic energy to be absorbed for the period from the start to end of the shift. Depending upon the speed stage selected to pass through, moreover, there occurs the so-called "simultaneous shifts", in which the engagement/release states of three or more frictional engagement means have to be simultaneously switched. In this respect, too, there arises another problem that the shift shocks are deteriorated, or that the shift controls become difficult.

According to the method disclosed in Japanese Patent Publication No. 61-58697, on the other hand, the shift is stepwise set at each intermediate speed stage when the so-called "jump shift" is to be carried out, so that the shift shocks can be reduced. Despite of this advantage, however, the achievement of the target speed stage may be delayed, and the engagement/release the frictional engagement means for executing the shift may have to be frequently switched to invite another disadvantage in the maintenance of durability. In case of the aforementioned shift through an intermediate stage disclosed in the Japanese Patent Laid-Open No. Hei 1-224552 so as to reduce the shift shocks at the time of executing the shift jumping two or more stages, what can be executed by the proposed means is substantially stepwise because an intermediate stage has to be passed in case of a shift between two adjacent stages, thus causing a problem like the aforementioned one.

SUMMARY OF THE INVENTION

A major object of the present invention is to reduce the shift shocks and to improve the durability of frictional engagement means by reducing the amount of energy to be absorbed for a shift by one frictional engagement means.

Another object of the present invention is to reduce the shift shocks by making effective use of auxiliary speed stage which is left unused for an ordinary run.

Still another object of the present invention is to reduce the shift shocks by making effective use of an intermediate speed stage at the time of a shift other than those between adjacent speed stages.

A further object of the present invention is to reduce the shift shocks and to set the driver free from feeling a delay in the shift by making effective use of an intermediate speed stage at the time of a jump shift.

An automatic transmission according to the present invention comprises:

a gear train comprising a plurality of planetary gear sets each having rotary members;

a plurality of frictional engagement means for setting a plurality of main speed stages for an ordinary run and an auxiliary speed stage having a gear ratio of an intermediate value between those of said main speed stages and left unused for the ordinary run by either connecting the rotary members of said planetary gear sets or stopping the revolutions of said rotary members to change the transmission passage of a drive force through said gear train;

hydraulic control means for changing the engagement/release statuses of said frictional engagement means;

shift decision means for deciding a shift from a predetermined one of said main speed stages to another main;

auxiliary speed stage selection means for selecting such an auxiliary speed stage between said main speed stages as is freed from reversing the direction of changing the number of revolutions of the rotary members of said planetary gear sets; and output means for outputting such an instruction signal to said hydraulic control means as to set said auxiliary speed stage temporarily at the time of the shift between said main speed stages.

In an automatic transmission of the present invention, moreover, said auxiliary speed stage selection means selects such an auxiliary speed stage as can minimize the number of the frictional engagement means, the engagement/release statuses of which are to be switched substantially simultaneously at the time of a shift from said predetermined main speed stage to another main.

In an automatic transmission of the present invention, moreover, said auxiliary speed stage selection means selects different auxiliary speed stages in case the shift between said main speed stages is an upshift or downshift.

An automatic transmission of the present invention comprises:

a gear train comprising a plurality of planetary gear sets each having rotary members;

a plurality of frictional engagement means for setting a plurality of speed stages by either connecting the rotary members of said planetary gear sets or stopping the revolutions of said rotary members to change the transmission passage of a drive force through said gear train;

hydraulic control means for changing the engagement/release statuses of said frictional engagement means;

shift decision means for deciding a shift from one of said speed stages to another;

intermediate stage selection means for selecting such an intermediate speed stage between speed stages, in which the one of the speed stages and another are apart two or more stages from each other, as can have both a small number of said frictional engagement means for changing the engagement/release statuses substantially simultaneously and a small cumulative number of fluctuating revolutions of the rotary members of said planetary gear sets; and output means for outputting such an instruction signal to said hydraulic control means as to set said intermediate speed stage temporarily at the time of the shift between said speed stages.

An automatic transmission of the present invention comprises:

a gear train comprising a plurality of planetary gear sets each having rotary members;

a plurality of frictional engagement means for setting a plurality of speed stages by either connecting the rotary members of said planetary gear sets or stopping the revolutions of said rotary members to change the transmission passage of a drive force through said gear train;

hydraulic control means for changing the engagement/release statuses of said frictional engagement means;

shift decision means for deciding a shift from one of the speed stages to another;

intermediate stage selection means for selecting an intermediate speed stage of a lower gear ratio between the one of the speed stages and another, which are apart three or more stages from each other, in case a shift inbetween is an upshift, and an intermediate speed stage of a higher gear ratio inbetween in case said shift is a downshift; and output means for outputting such an instruction signal to said hydraulic control means as to set said intermediate speed stage temporarily at the time of the shift between said speed stages.

In a shift control method of the present invention, an intermediate speed stage of a lower gear ratio between a present speed stage and another to be set after a shift, which are apart three or more stages from each other, is temporarily set in case the shift inbetween is an upshift, and an intermediate speed stage of a higher gear ratio inbetween is temporarily set in case said shift is a downshift.

The above and further objects and novel features of the present invention will more fully appear from the following detailed detailed description when the same is read in connection with the accompanying drawings. It is to be expressly understood, however, that the drawings are for the purpose of illustrations only and is not intended as a definition of the limits of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
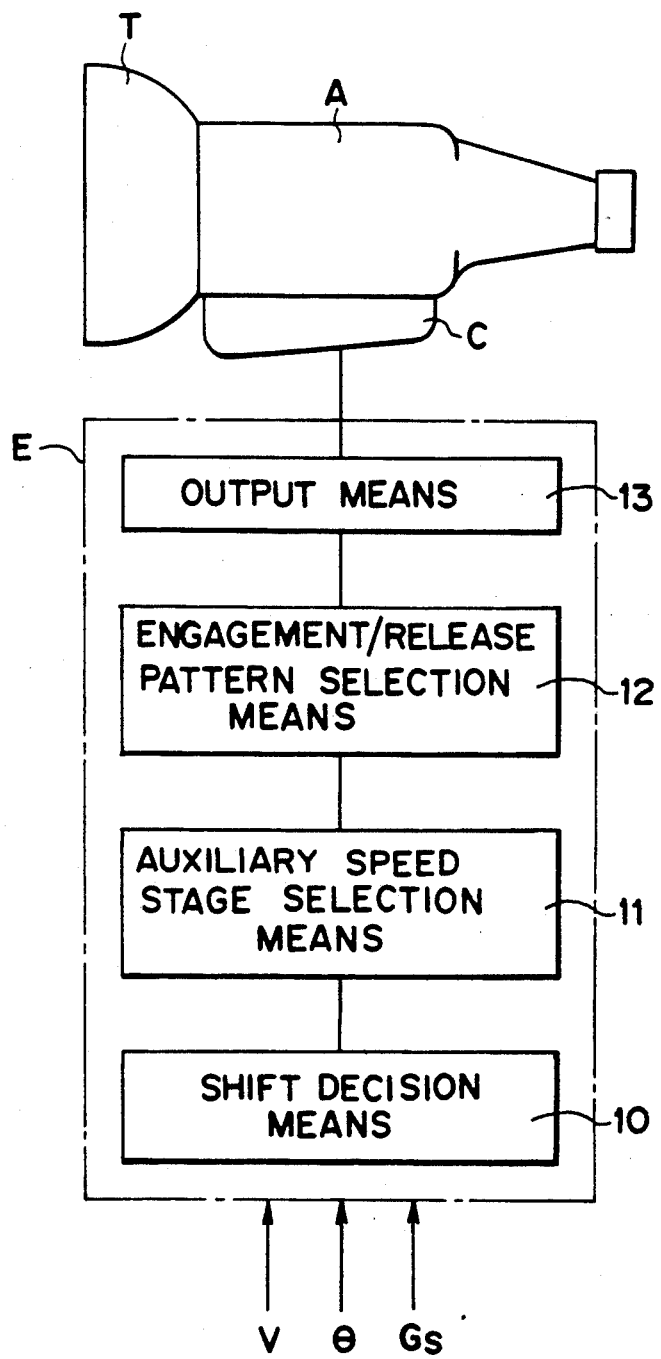
FIG. 1 is a block diagram showing a basic structure of one embodiment of the present invention.

In FIG. 1, an automatic transmission A to be connected through a torque converter T to a (not-shown) engine is equipped with a gear train and frictional engagement means, as will be described hereinbefore. This automatic transmission A is set to a plurality of speed stages by engaging or releasing the frictional engagement means with an oil pressure to be outputted from a hydraulic control unit C.

This hydraulic control unit C is equipped, for example, with a plurality of (not-shown) solenoid valves, which are to be turned on or off in response to a signal to be outputted from an electronic control unit (ECU) E. This electronic control unit E is composed mainly of a microcomputer which is made receptive of control data such as a vehicle speed V, a throttle opening $\theta$ or a speed stage Gs at present. Moreover, the hydraulic control unit C is composed of shift decision means 10, auxiliary speed stage selection means 11, engagement/release pattern selection means 12 and output means 13.

The shift decision means 10 decides both whether or not a shift is to be executed and what speed stage is to be set, when a running status to be determined by the vehicle speed V and the throttle opening $\theta$ exceeds a predetermined shift point. On the other hand, the auxiliary speed stage selection means 11 selects an auxiliary speed stage left unused for an ordinary run. Specifically, the gear train can be set either at a main speed stage used for the ordinary run and at an auxiliary speed stage having an intermediate gear ratio between those of the main speed stages but left unused for the ordinary run. Thus, the aforementioned shift decision means 10 selects a main speed stage on the basis of the running condition. On the contrary, the auxiliary speed stage selection means 11 selects such an auxiliary speed stage, at the shifting time to a main speed stage selected, i.e., a main speed stage to be set, as can leave unchanged the direction of changing the number of revolutions of the rotary members of the gear train. Moreover, the engagement-/release pattern selection means 12 selects a combination pattern of engagement/release of the frictional engagement means for setting a target main speed stage or an auxiliary speed stage. Depending upon the manner to select the combination pattern of engagement/release of the frictional engagement means (as will be shortly referred to as the "engagement/release pattern"), the number of the frictional engagement means to be switched for executing the shift is different. Therefore, the engagement/release pattern selection means 12 selects such an engagement/release pattern as can reduce the number of the frictional engagement means to be switched. Moreover, the output means 13 outputs an instruction signal to the hydraulic control unit C so that the aforementioned auxiliary speed stage and main speed stage may be sequentially set in accordance with the engagement/release pattern selected.

The present invention will be described in more detail in the following in connection with the embodiments thereof.

Figure 2:
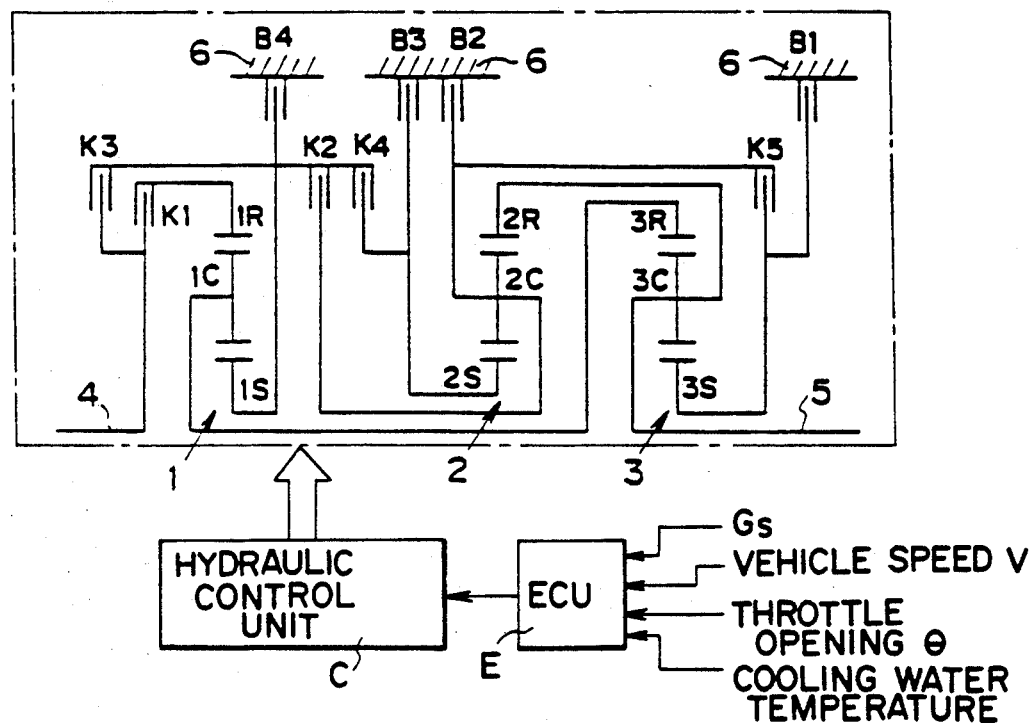
FIG. 2 is a skeleton diagram showing one example of the gear train of the basic structure.

An example shown in FIG. 2 is composed mainly of three single-pinion type planetary gear sets 1, 2 and 3, the individual elements of which are connected, as follows. The carrier 1C of the first planetary gear set 1 and the ring gear 3R of the third planetary gear set 3 are so connected to each other that they can revolve together, and the ring gear 2R of the second planetary gear set 2 and the carrier 3C of the third planetary gear set 3 are so connected to each other that they can revolve together. Moreover, the sun gear 1S of the first planetary gear set 1 is connected to the carrier 2C of the second planetary gear set 2 through second clutch means K2 and further to the sun gear 2S of the second planetary gear set 2 through fourth clutch means K4. The carrier 2C of the second planetary gear set 2 in turn is connected to the sun gear 3S of the third planetary gear set 3 through the fifth clutch means K5.

Incidentally, the individual elements recited above can adopt such a connecting mechanism, e.g., a quill shaft, a solid shaft or a suitable connecting drum as is currently used in the existing automatic transmission.

An input shaft 4 is connected the (not-shown) engine through power transmission means such as a torque converter or a fluid coupling. Between this input shaft 4 and the ring gear 1R of the first planetary gear set 1, there is interposed first clutch means K1 for connecting the two selectively. Between the input shaft 4 and the sun gear 1S of the first planetary gear set 1, on the other hand, there is interposed third clutch means K3 for connecting the two selectively.

In short, the individual clutch means K1, K2, K3, K4 and K5 thus far described are used to connect the aforementioned individual members selectively and to release the connections. These clutch means K1 to K5 to be adopted can be exemplified by the wet type multiple disc clutch, the one-way clutch or the series or parallel arrangement of those multiple disc clutch and one-way clutch, all of which are to be engaged or released by a mechanism such as the hydraulic servomechanism used generally in the automatic transmission of the prior art. Since the individual structural components are restricted in their arrangement for the practical applications, it is quite natural that suitable intermediate members such as the connecting drums can be interposed as the connecting members for the clutch means K1, K2, K3, K4 and K5.

Between the sun gear 3S of the third planetary gear set 3 and a transmission casing (which will be shortly referred to as the "casing") 6, on the other hand, there is interposed first brake means B1 for blocking the revolutions of the sun gear 3S selectively. Between the carrier 2C of the second planetary gear set 2 and the casing 6, moreover, there is interposed second brake means B2 for blocking the revolutions of the carrier 2C selectively. Between the sun gear 2S of the second planetary gear set 2 and the casing 6, still moreover, there is interposed third brake means B3 for blocking the revolutions of the sun gear 2S selectively. Between the sun gear 1S of the first planetary gear set 1 and the casing 6, furthermore, there is interposed fourth brake means B4 for blocking the revolutions of the sun gear 1S selectively. These brake means B1, B2, B3 and B4 to be adopted can be exemplified by the wet type multiple disc brake, the band brake or the one-way clutch or their combination, all of which are to be driven by a mechanism such as the hydraulic servomechanism used generally in the automatic transmission of the prior art. For practical uses, it is quite natural that suitable connecting members can be interposed between those brake means B1, B2, B3 and B4 and either the individual elements to be fixed by the brake means B1 to B4 or the casing 6.

Moreover, an output shaft 5 for transmitting torque to the propeller shaft or the counter gear (although not shown individually) is connected to the ring gear 2R of the second planetary gear set 2 and the carrier 3C of the third planetary gear set 3, which in turn are connected to each other.

The individual speed stages of the automatic transmission thus constructed are set by engaging or releasing the above-specified clutch means and brake means properly to change the mutually connected statuses, the connected statuses to the input shaft and the stopped statuses of the rotary members of the planetary gear sets 1, 2 and 3. For these settings, the hydraulic control unit C is provided for controlling the engagement/release of the individual frictional engagement means such as the aforementioned clutch means and brake means, and the electronic control unit E is provided for determining a speed stage on the basis of input data such as the vehicle speed V, the throttle opening $\theta$ or a cooling water temperature and for outputting to the hydraulic control unit C an instruction signal for setting that speed stage. The structure of the electronic control unit E composed mainly of a program will be clarified by the later-described operations.

Figure 3:
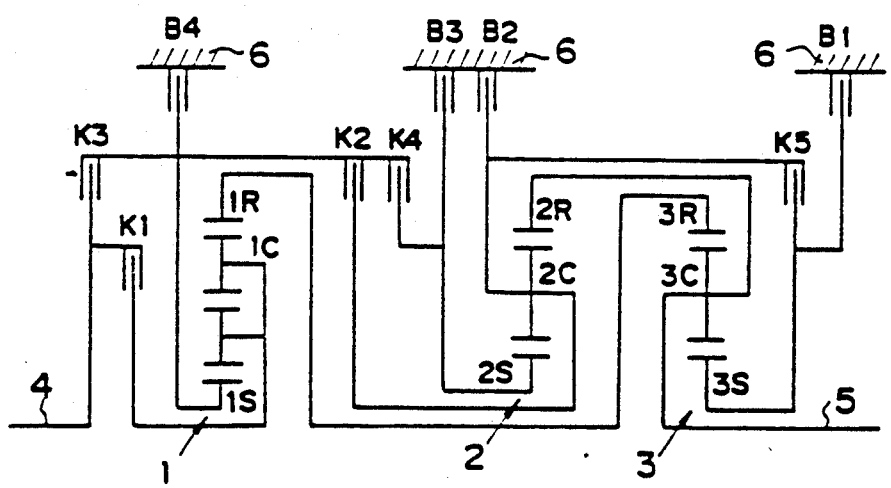
FIGS. 3 to 25 are skeleton diagrams respectively showing other examples of the gear train.

A gear train shown in FIG. 3 is modified from the aforementioned structure shown in FIG. 2 by replacing the first planetary gear set 1 by a double pinion type planetary gear set. Accordingly, the ring gear 1R of the first planetary gear set 1 is connected to the ring gear 3R of the third planetary gear set 3, and the carrier 1C of the first planetary gear set 1 is connected to the input shaft 4 through the first clutch means K1. The remaining structure is similar to that shown in FIG. 2.

The automatic transmissions individually having the structures, as shown in FIGS. 2 and 3, are enabled to set a plurality of main speed stages, which have gear ratios in a relation close to geometric series, for forward five and reverse one speeds and additionally the so-called "2.2th, 2.5th and 2.7th" speeds between the forward 2nd and 3rd speeds and the so-called "3.2th and 3.5th" speeds between the forward 3rd and 4th speeds. The auxiliary speed stages to be set between those main ones do not always have gear ratios proper for the run in relation to their higher or lower speed stages, and accordingly the ordinary run is effected according to those main five and reverse stages. At the speeds other than the 2.2th, 2.7th, 3.2th and 3.5th speeds, moreover, there are a plurality of sets of engagement/release combinations (i.e., the so-called "engagement/release patterns") of the clutch means and the brake means for setting those other speeds, as tabulated in the form of the clutch and brake application chart in Table 1. Moreover, the numbers of revolutions of the rotary members of the individual planetary gear sets 1, 2 and 3 at the individual speed stages are enumerated in Table 2. In Table 1: symbols ◯ indicate that the elements are engaged; blanks indicate that the elements are released; and symbols * indicate that the elements may be engaged. In addition, these symbols * further indicate: that neither the gear ratio nor the revolving state is changed even if the elements such as the fifth clutch means K5 or the first brake means B1 at the 1st speed are released; that not the gear ratio but the revolving state is changed if the first brake means B1 is released, as in the pattern of the column b at the 4th speed; and that neither the gear ratio nor the revolving state is changed if the elements such as the fourth clutch means K4 or the third brake means B3 in the patterns in the column b at the 2nd speed are released with the other means indicated at the symbols * being engaged. In Tables 1 and 2, moreover, the columns, as designated at reference letters a, b, c, - - - , and so on at the 2nd, 3rd, 4th, 5th and reverse speeds, indicate such ones of the engagement/release patterns for setting the corresponding speed stages that the revolving elements of the planetary gear sets have different numbers of revolutions. Still moreover, symbols ①, ②, ③, - - - , and so on designate the kinds of the engagement/release patterns in which the revolving elements of the planetary gear sets do not have different numbers of revolutions. Furthermore, the values appearing in Table 2 are indicated at ratios in case the gear ratios (i.e., the ratios of the tooth numbers of the sun gears and the ring gears) of the individual planetary gear sets 1, 2 and 3 for $\rho1=0.450$, $\rho2=0.405$ and $\rho3=0.405$ in the example shown in FIG. 2 and for $\rho1=0.310$, $\rho2=0.450$ and $\rho3=0.405$ in the example shown in FIG. 3 and in case the input r.p.m. is "1".

TABLE 2-continued

| | | | 1st planetary gear set | | | 2nd planetary gear set | | | 3rd planetary gear set | | |
|---|---|---|---|---|---|---|---|---|---|---|---|
| | | | 1S | 1C | 1R | 2S | 2C | 2R | 3S | 3C | 3R |
| | | ②③④ | | | | | | | | | |
| | b | | | 1.41 | 1.59 | | | | 0.00 | | 1.41 |
| 5th | a | | 1.00 | 1.57 | 1.83 | 0.00 | 1.00 | 1.41 | 1.00 | 1.41 | 1.57 |
| | b | | | 1.00 | 1.00 | | | | 2.40 | | 1.00 |
| | c | | | 1.97 | 2.41 | | | | 0.00 | | 1.97 |
| Rev | a | ①② | 1.00 | −0.57 | −1.28 | 1.00 | 0.00 | −0.41 | 0.00 | −0.41 | −0.57 |
| | b | | | 1.00 | 1.00 | | | | −3.87 | | 1.00 |

As could be seen from those Tables, the automatic transmissions shown in FIGS. 2 and 3 have room for selecting a plurality of engagement/release patterns even in case the main forward speed stages of the 1st, 2nd, 3rd, 4th and 5th speeds having gear ratios in a relation approximate to the geometric series are to be set. Even in case of a shift from a predetermined speed stage to another, moreover, there are a multiplicity of kinds of combinations of the engagement/release patterns of the frictional engagement means. Depending upon what of the alphabetized columns is to be selected, there are made different the numbers of revolutions of the rotary members, i.e., the sun gears, ring gears and carriers of the individual planetary gear sets 1, 2 and 3.

In the automatic transmissions having the structures shown in FIGS. 2 and 3, the ordinary run is carried out at the aforementioned main speed changes. Depending upon the running conditions, however, the shift may be effected not only to an adjacent main speed stage but also to an apart main speed stage. Moreover, the automatic transmissions are preferably enabled to perform the so-called "jumping shift". In case of this jumping shift, however, a multiplicity of kinds are established in the engagement/release patterns before and after the shift. As could be deduced from the fact that the gear ratios before and after the shift are apart, the individual engagement/release patterns are relatively highly different. Let a jumping shift from the 1st to 5th speeds be taken up as an example. At the 1st speed, not only the first clutch means K1 but at least three of the fourth and fifth clutch means K4 and K5 and the first and second brake means B1 and B2 are engaged. At the 5th speed, on the contrary, the second and third clutch means K2 and K3 and the third brake means B3 never fail to be engaged. In case of such jumping shift, therefore, the number of the frictional engagement means to have their engagement/release statuses switched is increased. This makes it difficult to optimize the timings for switching the engagement/release patterns of those frictional engagement means and it liable to cause the shift shocks. On the other hand, the number of fluctuating revolutions of the rotary members in case of the jumping shift become different according to the engagement/release pattern selected. In respect of reducing the shift shocks, however, it is advantageous to select a pattern having a small number of fluctuating revolutions.

In case to a main speed stage other than the adjacent ones, moreover, it is conceivable that the number of the frictional engagement means to have the engagement/release statuses switched substantially simultaneously is decreased by temporarily setting another intermediate speed stage between the individual speed stages. Merely by way of the intermediate speed step, however, the numbers of revolutions of the rotatry members are increased, and the directions of changing the revolutions are reversed. Thus, the accompanying inertia force may adversely affect the shift shocks. In the automatic transmission having the structure shown in FIGS. 2 or 3, more specifically, the number of the frictional engagement means to have their engagement/release statuses switched substantially simultaneously is decreased in case the 4th speed is to be temperarily set according to any of the patterns enumerated in the column a of Table 1 for the 4th speed. As could be seen from Table 2, on the contrary, the sun gear 2S of the second planetary gear set 2 is accelerated from the revolutions of "−0.78" to the revolutions of "1.00" and then to the revolutions of "0.00" so that the direction of changing the revolutions is reversed. Moreover, the fluctuating width of the number of revolutions (i.e., the cumulative number of fluctuating revolutions) is changed to "2.78". In other words, the number and direction of revolutions are highly changed within a short period so that the inertia force is increased to affect the shift shocks adversely.

In the automatic transmission shown in FIGS. 2 or 3, therefore, one of intermediate auxiliary speed stages, if any, between two speed changes is effectively utilized to reduce the shift shocks. Specifically, such one of auxiliary speed stages existing between a present speed stage and a target speed stage to be set by the shift is selected as can leave the direction of changing the revolutions of the rotary members unreversed, as can have a reduced number of frictional engagement means to have their engagement/release statuses switched substantially simultaneously and as can have a small cumulative number of fluctuating revolutions of the rotary members till the end of the shift. The shift to the target speed stage is effected by way of the auxiliary speed stage selected. Several examples are tabulated in the following. Incidentally, symbols ⊙ indicate that the elements may be released but had better be engaged prior to execution of the shift, and symbols Δ indicate that the element may be engaged but had better be released prior to execution of the shift.

In the first case, the shift is jumped from the 1st to the 5th speed by way of the 2.5th speed and the 3.5th speed. The clutch and brake application charts for executing the shift are tabulated in Tables 3 to 7.

TABLE 3

| | Clutch Means | | | | | Brake Means | | | |
|---|---|---|---|---|---|---|---|---|---|
| | K1 | K2 | K3 | K4 | K5 | B1 | B2 | B3 | B4 |
| 1st | ③ | ○ | | ○ | ⊙ | ○ | ○ | | |
| 2.5th | ② | ○ | | | ○ | ○ | Δ | ○ | |
| 3.5th | ① | ○ | | ○ | ○ | | | ○ | Δ |

TABLE 3-continued

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 5th | a |  | ○ | ○ | ⊙ |  |  |  | ○ |  |

TABLE 4

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 1st |  | ① | ○ |  |  | ○ | ○ | ○ | △ |  |
| 2.5th |  | ① | ○ |  | ○ | ○ |  |  | ○ | △ |
| 3.5th |  |  | ○ |  | ○ | ○ |  |  | ○ |  |
| 5th | a |  | ○ | ○ | ⊙ |  |  |  | ○ |  |

TABLE 5

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 1st |  | ② | ○ |  |  | ○ | ○ | △ | ○ |  |
| 2.5th |  | ① | ○ |  | ○ | ○ |  |  | ○ | △ |
| 3.5th |  |  | ○ |  | ○ | ○ |  |  | ○ |  |
| 5th | a |  | ○ | ○ | ⊙ |  |  |  | ○ |  |

TABLE 6

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 1st |  | ① | ○ |  |  | ○ | ○ | ○ | △ |  |
| 2.5th |  | ① | ○ |  | ○ | ○ |  |  | ○ | △ |
| 3.5th |  |  | ○ |  | ○ | ○ |  |  | ○ |  |
| 5th | b | ⊙ | ○ | ○ |  |  |  |  | ○ |  |

TABLE 7

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 1st |  | ② | ○ |  |  | ○ | ○ | △ | ○ |  |
| 2.5th |  | ① | ○ |  | ○ | ○ |  |  | ○ | △ |
| 3.5th |  |  | ○ |  | ○ | ○ |  |  | ○ |  |
| 5th | b | ⊙ | ○ | ○ |  |  |  |  | ○ |  |

If the jumping shift from the 1st to 5th speeds is caused to pass through the 2.5th speed (especially its pattern ①) and the 3.5th speed in accordance with these Tables, any of the rotary members does not have its direction of changing the revolutions reversed in the course of the shift, but the number of the frictional engagement means to have their engagement/release statuses switched substantially simultaneously is decreased to two or less. In addition, the cumulative number of fluctuating revolutions of the rotary members is left unchanged from that of a case of the direct shift from the 1st to 5th speeds. If the shift is assumed to pass the 2.5th speed only for reference, the revolving directions of the individual rotary members are not reversed. At the 2.5th speed, however, the first clutch means K1, the fourth clutch means K4, the fifth clutch means K5 and the third brake means B3 are engaged, and, at the 5th speed, the second clutch means K2 and the third clutch means K3 never fail to be engaged whereas the first clutch means K1 is released. As a result, the number of the frictional engagement means to have their engagement/release statuses is increased. In case of the jumping shift from the 1st to 5th speeds, on the other hand, let it be assumed that not the aforementioned auxiliary speed stage but the 3rd one of the main speed stages for the ordinary run be passed. In this case, it is conceivable to set such one of the engagement/release patterns for setting the 3rd speed as is enumerated in the column c and subsequently the pattern enumerated in the column b and thereafter to execute the shift to the 5th speed. Then, the number of two or less is sufficient for the frictional engagement means to be switched substantially simultaneously. According to the pattern of the column c of the 3rd speed, however, the carrier 2C of the secondary planetary gear set 2 revolves at the number of revolutions of "0.79". According to the pattern of the column b, on the other hand, the carrier 2C revolves at the number of revolutions of "0.51". As a result, the number of revolutions is temporarily decreased, that is to say, the direction of changing the revolutions is reversed. As a result, the cumulative number of fluctuating revolutions of the carrier 2C is increased to "1.56", which is larger than that of the case of the direct shift from the 1st to 5th speeds. It can therefore be concluded that the jumping shift from the 1st to 5th speeds is preferably caused to pass through both the 2.5th speed and the 3.5th speed.

Next, the jumping shift from the 2nd to 5th speeds will be described in the following. In this case, there are a plurality of kinds of the speed stages to be passed. The cases of passing the 2.5th speed and the 3.5th speed are tabulated in Tables 8 to 21. On the other hand, the case of passing the 3.2th speed and the 3.5th speed is tabulated in Table 22.

TABLE 8

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 2nd | a | ③ | ○ | ○ |  | ○ | △ | △ |  | ○ |
| 2.5th |  | ③ | ○ |  | △ | ○ |  |  | ○ | ○ |
| 3.5th |  |  | ○ |  | ○ | ○ |  |  | ○ |  |
| 5th | a |  | ○ | ○ | ⊙ |  |  |  | ○ |  |

TABLE 9

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 2nd | a | ⑤ | ○ | △ |  | ⊙ | ○ | △ |  | ○ |
| 2.5th |  | ③ | ○ |  | △ | ○ |  |  | ○ | ○ |
| 3.5th |  |  | ○ |  | ○ | ○ |  |  | ○ |  |
| 5th | a |  | ○ | ○ | ⊙ |  |  |  | ○ |  |

TABLE 10

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 2nd | a | ⑥ | ○ | △ |  | ○ | △ | ○ |  | ○ |
| 2.5th |  | ③ | ○ |  | △ | ○ |  |  | ○ | ○ |
| 3.5th |  |  | ○ |  | ○ | ○ |  |  | ○ |  |
| 5th | a |  | ○ | ○ | ⊙ |  |  |  | ○ |  |

TABLE 11

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 2nd | a | ③ | ○ | ○ |  | ○ | △ | △ |  | ○ |
| 2.5th |  | ③ | ○ |  | △ | ○ |  |  | ○ | ○ |
| 3.5th |  |  | ○ |  | ○ | ○ |  |  | ○ |  |
| 5th | b | ⊙ | ○ | ○ |  |  |  |  | ○ |  |

TABLE 12

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 2nd | a | ⑤ | ○ | △ |  | ⊙ | ○ | △ |  | ○ |
| 2.5th |  | ③ | ○ |  | △ | ○ |  |  | ○ | ○ |
| 3.5th |  |  | ○ |  | ○ | ○ |  |  | ○ |  |

TABLE 12-continued

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 5th | b | ⊙ | ○ | ○ |  |  |  |  | ○ |  |

TABLE 13

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | a | ⑥ | ○ | △ |  |  | ○ | △ | ○ |  | ○ |
| 2.5th |  | ③ | ○ |  |  | △ | ○ |  |  | ○ | ○ |
| 3.5th |  |  | ○ |  | ○ |  | ○ |  |  | ○ |  |
| 5th | b |  | ⊙ | ○ | ○ |  |  |  |  | ○ |  |

TABLE 14

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ① | ○ |  |  | ○ |  | ○ |  | ○ | △ |
| 2.5th |  | ① | ○ |  |  | ○ | ○ |  |  | ○ | △ |
| 3.5th |  |  | ○ |  | ○ |  | ○ |  |  | ○ |  |
| 5th | a |  |  | ○ | ○ | ⊙ |  |  |  | ○ |  |

TABLE 15

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ① | ○ |  |  | ○ |  | ○ |  | ○ | ⊙ |
| 2.5th |  | ③ | ○ |  |  | △ | ○ |  |  | ○ | ○ |
| 3.5th |  |  | ○ |  | ○ |  | ○ |  |  | ○ |  |
| 5th | a |  |  | ○ | ○ | ⊙ |  |  |  | ○ |  |

TABLE 16

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ② | ○ |  |  | ⊙ |  | ○ | ⊙ | ○ | ○ |
| 2.5th |  |  | ○ |  |  | ○ | ○ |  |  | ○ | △ |
| 3.5th |  | ① | ○ |  | ○ |  | ○ |  |  | ○ |  |
| 5th | a |  |  | ○ | ○ | ⊙ |  |  |  | ○ |  |

TABLE 17

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ② | ○ |  |  | △ |  | ○ | ⊙ | ○ | ○ |
| 2.5th |  | ③ | ○ |  |  | △ | ○ |  |  | ○ | ○ |
| 3.5th |  |  | ○ |  | ○ |  | ○ |  |  | ○ |  |
| 5th | a |  |  | ○ | ○ | ⊙ |  |  |  | ○ |  |

TABLE 18

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ① | ○ |  |  | ○ |  | ○ |  | ○ | △ |
| 2.5th |  | ① | ○ |  |  | ○ | ○ |  |  | ○ | △ |
| 3.5th |  |  | ○ |  | ○ |  | ○ |  |  | ○ |  |
| 5th | b |  | ⊙ | ○ | ○ |  |  |  |  | ○ |  |

TABLE 19

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | a | ① | ○ |  |  | ○ |  | ○ |  | ○ | ⊙ |
| 2.5th |  | ③ | ○ |  |  | △ | ○ |  |  | ○ | ○ |
| 3.5th |  |  | ○ |  | ○ |  | ○ |  |  | ○ |  |
| 5th | b |  | ⊙ | ○ | ○ |  |  |  |  | ○ |  |

TABLE 20

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ② | ○ |  |  | ⊙ |  | ○ | ⊙ | ○ | ○ |
| 2.5th |  | ① | ○ |  |  | ○ | ○ |  |  | ○ | △ |
| 3.5th |  |  | ○ |  | ○ |  | ○ |  |  | ○ |  |
| 5th | b |  | ⊙ | ○ | ○ |  |  |  |  | ○ |  |

TABLE 21

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ② | ○ |  |  | △ |  | ○ | ⊙ | ○ | ○ |
| 2.5th |  | ③ | ○ |  |  | △ | ○ |  |  | ○ | ○ |
| 3.5th |  |  | ○ |  | ○ |  | ○ |  |  | ○ |  |
| 5th | b |  | ⊙ | ○ | ○ |  |  |  |  | ○ |  |

TABLE 22

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ② | ○ | ○ |  |  | ○ | △ | ○ |  | △ |
| 3.2th |  |  | ○ | ○ |  |  | ○ |  |  | ○ |  |
| 3.5th |  |  | ○ |  | ○ |  | ○ |  |  | ○ |  |
| 5th | a |  |  | ○ | ○ | ⊙ |  |  |  | ○ |  |

If the jumping shift from the 2nd to 5th speeds is executed according to these Tables, any of the rotary members does not have its direction of changing the revolutions reversed in the course of the shift, as could be seen from Table 2, but the number of the frictional engagement means to have their engagement/release statuses switched substantially simultaneously is decreased to two or less. In addition, the cumulative number of fluctuating revolutions of any of the rotary members is not augmented. If the 3rd speed is passed for reference by setting the pattern of the column a of the 3rd speed, the direction of revolutions of the sun gear 2S of the second planetary gear set 2 is temporarily reversed according to that engagement/release pattern so that the cumulative number of fluctuating revolutions is accordingly augmented. As a result, the kinetic inertia energy to be absorbed by the time of the completion of the shift is augmented to invite a disadvantage for the reduction of the shift shocks.

On the other hand, the jumping shift from the 2nd to 4th speeds can be executed by way of the 2.5th or 2.7th speed, as enumerated in clutch and brake application charts in Tables 23 and 24.

TABLE 23

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ① | ○ |  |  | ○ |  | ○ |  | ○ | △ |
| 2.5th |  | ① | ○ |  |  | ○ | ○ |  |  | ○ | △ |
| 4th | a | ④ | ○ | △ | ○ | ○ | ○ |  |  |  |  |

TABLE 24

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 2nd | b | ① | ○ |  |  | ○ |  | ○ |  | ○ | △ |
| 2.7th |  |  | ○ | ○ |  | ○ |  | ○ |  |  |  |
| 4th | a | ③ | ○ | ○ | △ | ○ | ○ |  |  |  |  |

In case of the shift from 2nd to 4th speeds, the passage through the auxiliary speed stage so as to leave the direction of changing the revolutions of the rotary members unreversed is exemplified in addition to the above-specified Tables by a method of passing the 2.2th speed. However, this method is not preferable because the number of the frictional engagement means to have their engagement/release statuses switched is three or more in case of the shift from the 2.2th to 4th speeds.

Moreover, the shift from the 3rd to 4th speeds is not the jumping one but the shift between the adjacent ones of the main speed stages for the ordinary run. In the automatic transmission shown in FIG. 2 or 3, as could be seen from Table 1 or 2, two intermediate speed stages of the 3.2th speed and the 3.5th speed are interposed between those speed stages. In the present invention, therefore, the shift is executed through the 3.5th speed at the time of the shift between the 3rd and 4th speeds. The engagement/release pattern to be adopted in this case is tabulated in Table 25.

TABLE 25

|  | Clutch Means | | | | | Brake Means | | | |
| --- | --- | --- | --- | --- | --- | --- | --- | --- | --- |
|  | K1 | K2 | K3 | K4 | K5 | B1 | B2 | B3 | B4 |
| 3rd b | O |  | O |  |  | O |  | ⊙ |  |
| 3.5th | O |  | O |  | O |  |  | O |  |
| 4th a ② | O | O | O | Δ | O |  |  |  |  |

The rotational fluctuations of the rotary members in case the shift is executed according to Table 25 are known from Table 2, and any of the rotary members does not have its revolution changing direction reversed in the course of the shift. Moreover, the number of the frictional engagement means to have their engagement/release statuses switched is two or less.

The shifts according to the above-specified Tables are executed such that the hydraulic control unit C supplies or drains the oil pressure to the predetermined frictional engagement means on the basis of the output signal coming from the electronic control unit E to change their engagement/release patterns. One example of the control to pass the auxiliary speed stage will be described more specifically in the following.

The main speed stage to be set after the shift, i.e., the target speed stage is determined according to the shift diagram on the basis of the vehicle speed V and the throttle opening θ inputted to the electronic control unit E. In case the shift pattern of this example belongs to any of the clutch and brake application charts of Tables 3 to 25, the engagement/release pattern of the auxiliary speed stage to be passed for each shift pattern is programmed in advance and stored in the electronic control unit E. Prior to the output of the engagement-/release pattern for setting the target main speed stage, the engagement/release for setting the auxiliary speed stage to be passed is outputted to confirm the setting of the auxiliary speed stage according to either the output signal from the timer or the detected signal of the number of revolutions of any of the rotary members. After this, the engagement/release pattern for setting the target main speed speed is outputted.

Figure 4:
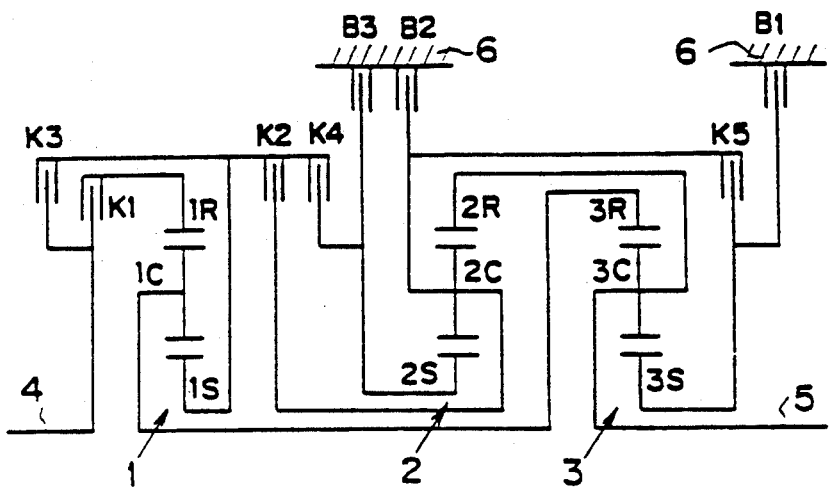
Figure 5:
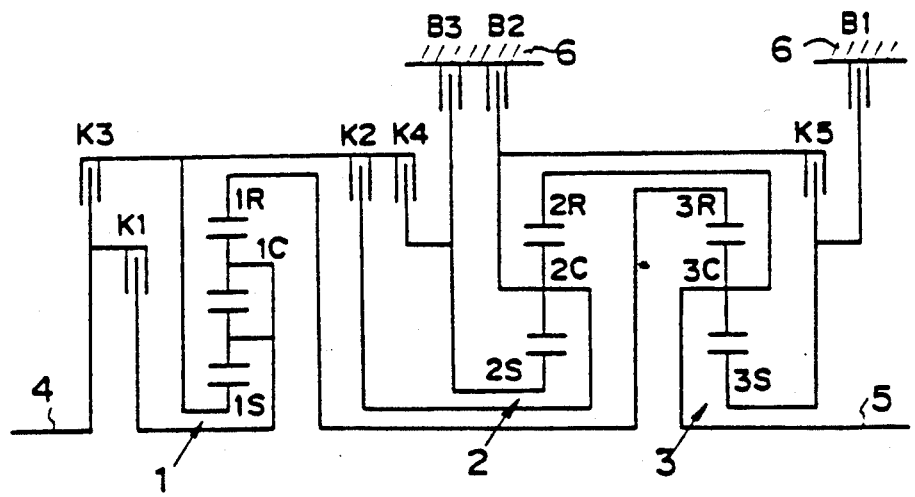

In the automatic transmission having the structure shown in FIG. 2 or 3, as could be apparent from the foregoing Table 1 or 2, the main speed stage of the 1st to 5th speeds can be set without engaging the fourth brake means B4. As a result, even the automatic transmission having none of the fourth brake means B4 can execute the shift making effective use of the auxiliary speed stage. Examples of the structure of such automatic transmission are shown in skeleton diagrams in FIGS. 4 and 5. In the example shown in FIG. 4, the fourth brake means B4 is eliminated from the aforementioned structure shown in FIG. 2. In the example shown in FIG. 5, on the other hand, the fourth brake means B4 is eliminated from the aforementioned structure shown in FIG. 3. In the automatic transmission having the structure shown in FIG. 4 or 5, therefore, such a control of Tables 3 to 25 according to the clutch and brake application chart as can leave the fourth brake means B4 disengaged may be executed in case of the shift passing the auxiliary speed stage. Specifically: the shift from the 1st to 5th speeds may follow Tables 3 to 7; the shift from the 2nd to 5th speeds may follow Tables 14, 18 and 22; the shift from the 2nd to 4th speeds may follow Tables 23 and 24; and the shift from the 3rd to 4th speeds may follow Table 25.

Figure 6:
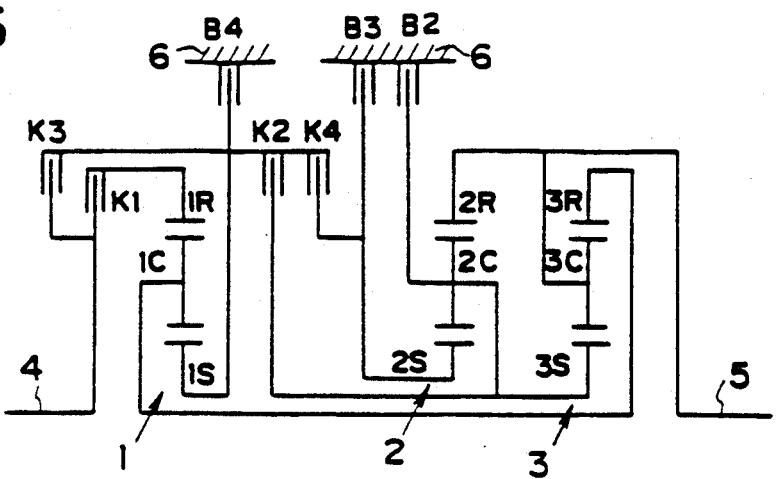
Figure 7:
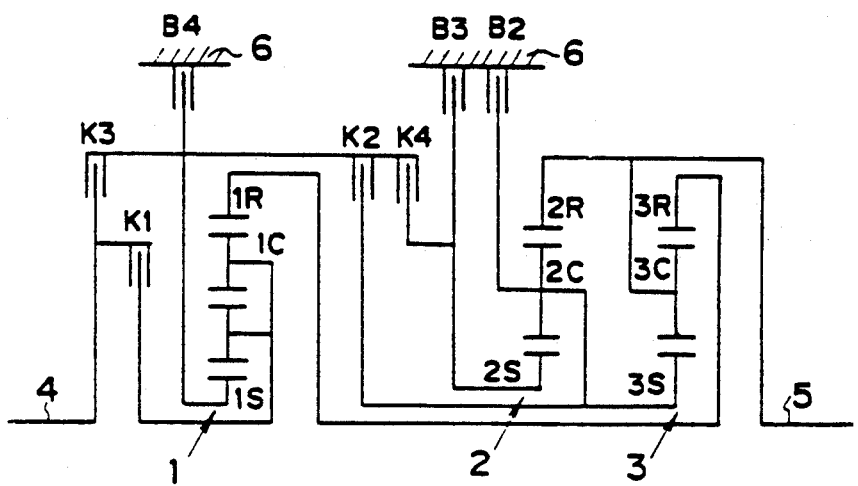
Figure 8:
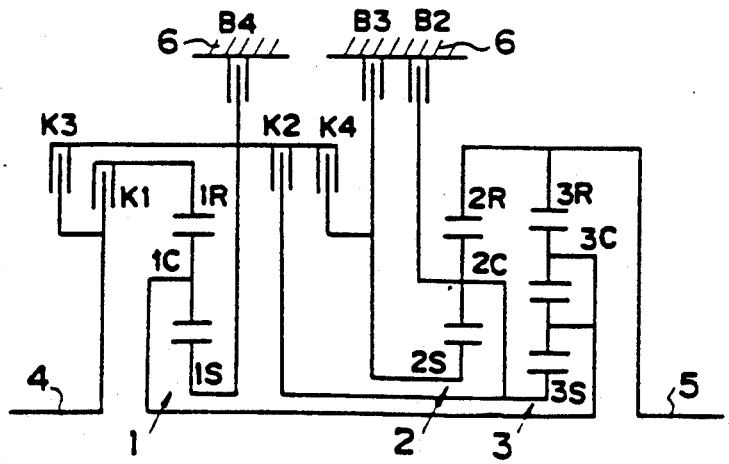

On the other hand, the automatic transmission having the structure shown in FIG. 2 or 3 can set the main forward five speeds and the reverse speed, even if the fifth clutch means K5 is engaged at all times whereas the first brake means B1 is released at all times. As a result, even the structure, in which those frictional engagement means are eliminated from the automatic transmission shown in FIG. 2 or 3, can execute the shift passing through the auxiliary speed stage like the aforementioned examples, as will be described with reference to FIGS. 6 to 8. In the example shown in FIG. 6, the fifth clutch means K5 of the structure shown in FIG. 2 is eliminated to connect the carrier 2C of the secondary planetary gear set 2 and the sun gear 3S of the third planetary gear set 3 at all times, and the first brake B1 is eliminated while leaving the remaining structure unchanged from the structure shown in FIG. 2. On the other hand, the structure shown in FIG. 7 is modified by improving the aforementioned structure of FIG. 3 like the above-specified example. In the example shown in FIG. 8, on the other hand, the third planetary gear set 3 of the aforementioned structure of FIG. 6 is replaced by a double-pinion type planetary gear set. Accordingly, the carrier 1C of the first planetary gear set 1 is connected to the carrier 3C of the third planetary gear set 3, and the ring gear 2R of the second planetary gear set 2 and the output shaft 5 are connected to the ring gear 3R of the third planetary gear set 3 while leaving the remaining structure unchanged from the structure shown in FIG. 6. In case of the shift passing the auxiliary speed stage in the automatic transmissions having structures shown in FIG. 6 to 8, it is advisable to execute such a control of Tables 3 to 25 as follows the clutch and brake application chart for engaging the fifth clutch means K5 at all times and releasing the first brake means B1 at all times. Specifically, the shift from the 1st to 5th speeds may follow Table 5, and the shift from the 2nd to 5th speeds may follow Table 8, 10 or 22.

Figure 9:
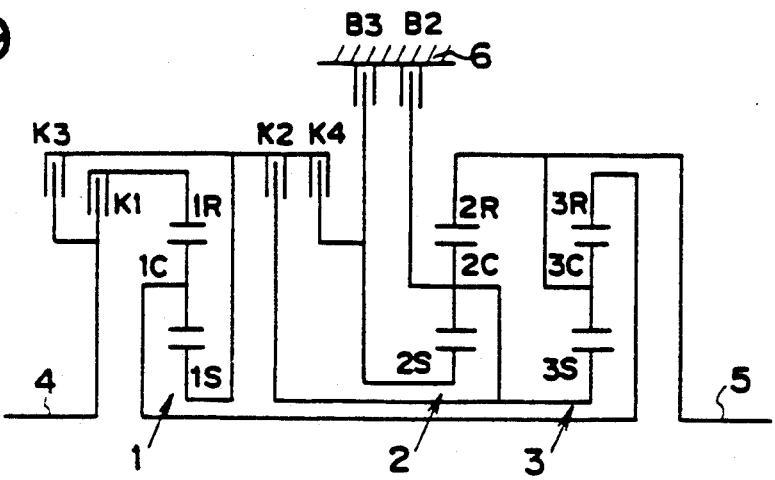
Figure 10:
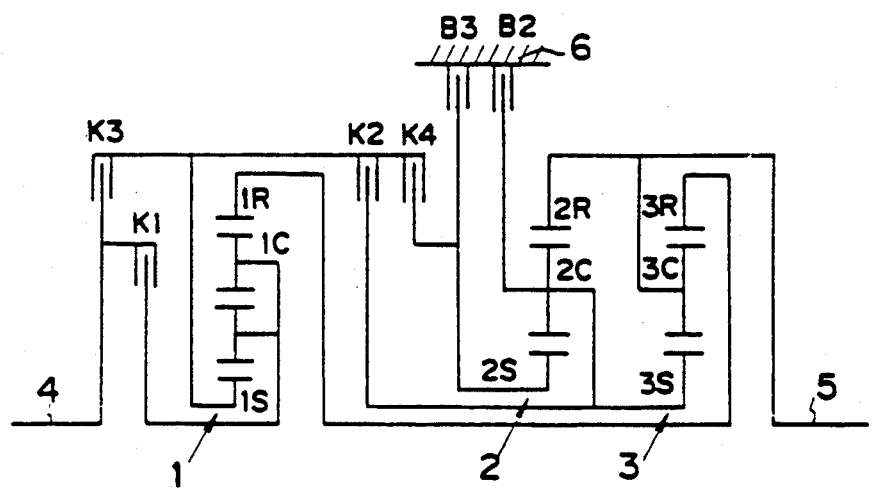
Figure 11:
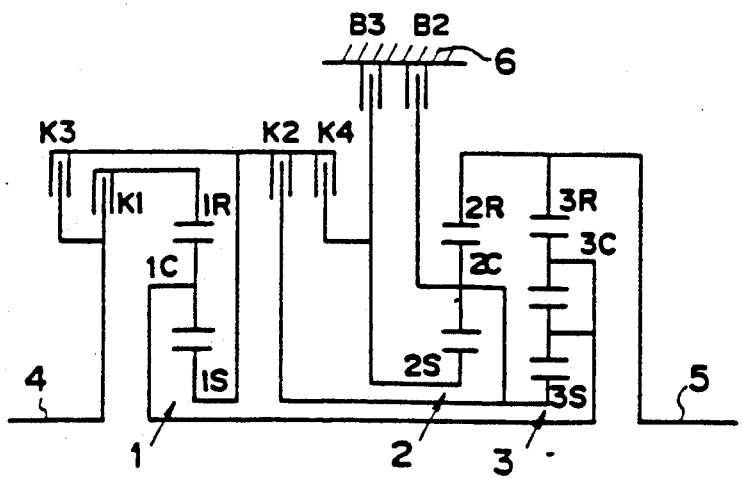

Moreover, the automatic transmission having the structure shown in FIG. 2 or 3 can set the main forward five and one reverse speeds even if the fifth clutch means K5 is engaged at all times and if the first brake means B1 and the fourth brake means B4 are released at all times. As a result, the shift making effective use of the auxiliary speed stage can be executed even by the structure which is made by eliminating those frictional engagement means from the automatic transmission shown in FIG. 2 or 3. This structure is exemplified in FIGS. 9 to 11. In the example shown in FIG. 9, the fifth clutch means K5 is eliminated from the structure of FIG. 2 to connect the carrier 2C of the second planetary gear set 2 and the sun gear 3S of the third planetary gear set 3 at all times, and the first brake means B1 and the fourth brake means B4 are eliminated to leave the remaining structure unchanged from that shown in FIG. 2. Moreover, the structure shown in FIG. 10 is made by improving the aforementioned structure of FIG. 3 like the above-specified example. In the example shown in FIG. 11, still moreover, the third planetary gear set 3 of the aforementioned structure of FIG. 9 is replaced by a double-pinion type planetary gear set to connect the carrier 1C of the first planetary gear set 1 to the carrier 3C of the third planetary gear set 3 accordingly, and the ring gear 2R of the second planetary gear set 2 and the output shaft 5 are connected to the ring gear 3R of the third planetary gear set 3 while leaving the remaining structure unchanged from the structure shown in FIG. 9. In case, therefore, a shift passing the auxiliary speed stage is to be executed in the automatic transmissions having the structures shown in FIGS. 9 to 11, it is advisable to follow such a clutch and brake application one of Tables 3 to 25 as engages the fifth clutch means K5 at all times and releases the first brake means B1 and the fourth brake means B4 at all times. In short, the shift from the 1st to 5th speeds may follow Table 5.

The structures of the aforementioned individual automatic transmissions are based upon the aforementioned gear train shown in FIG. 2. Despite of this fact, however, the present invention can be applied to structures based upon other gear trains, as will be exemplified in the following.

Figure 12:
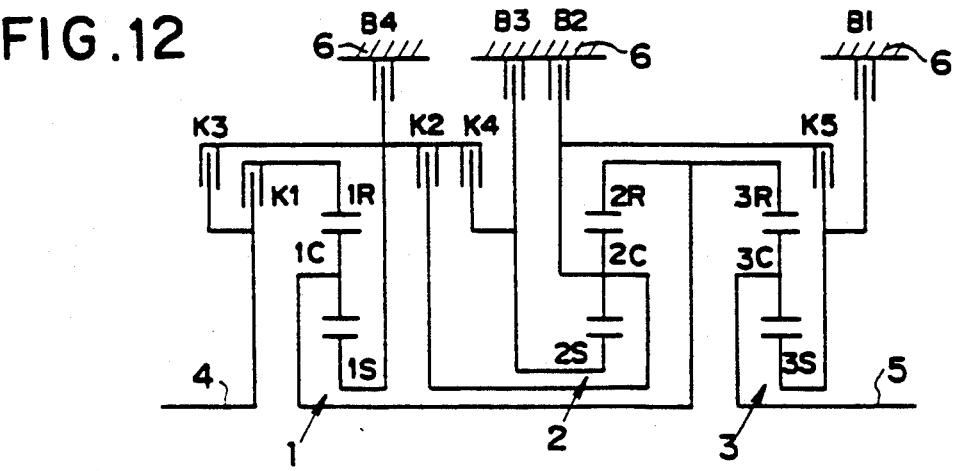

The example shown in FIG. 12 is modified from the foregoing structure of FIG. 2 by connecting the ring gear 2R of the second planetary gear set 2 not to the carrier 3C of the third planetary gear set 3 but to the ring gear 3R of the third planetary gear set 3 and accordingly by connecting the carrier 1C of the first planetary gear set 1 to the ring gear 2R of the second planetary gear set 2 and the ring gear 3R of the third planetary gear set 3. The remaining structure is left similar to that shown in FIG. 2.

Figure 13:
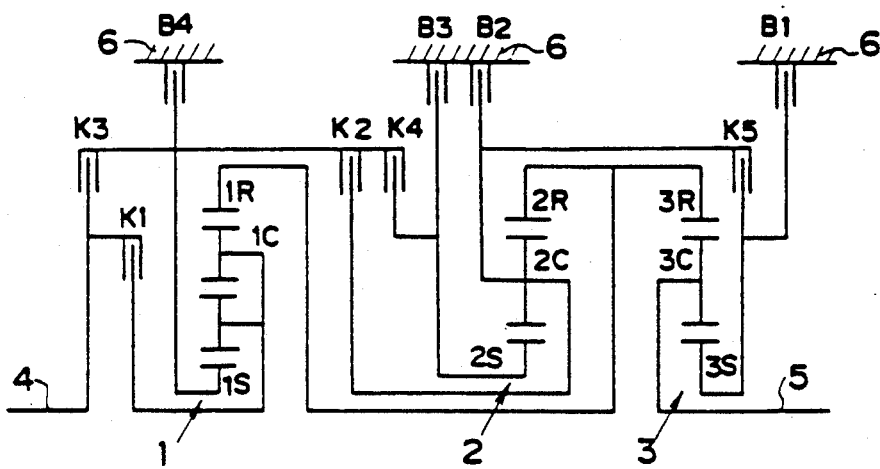

On the other hand, the example shown in FIG. 13 is modified from the aforementioned structure of FIG. 12 by changing the first planetary gear set 1 into a double pinion type planetary gear set and accordingly by connecting the ring gear 1R of the first planetary gear set 1 to the ring gears 2R and 3R of the second planetary gear set 2 and the third planetary gear set 3 and connecting the carrier 1C of the first planetary gear set 1 selectively to the input shaft 4 through the first clutch means K1. The remaining structure is left similar to that shown in FIG. 12.

Figure 14:
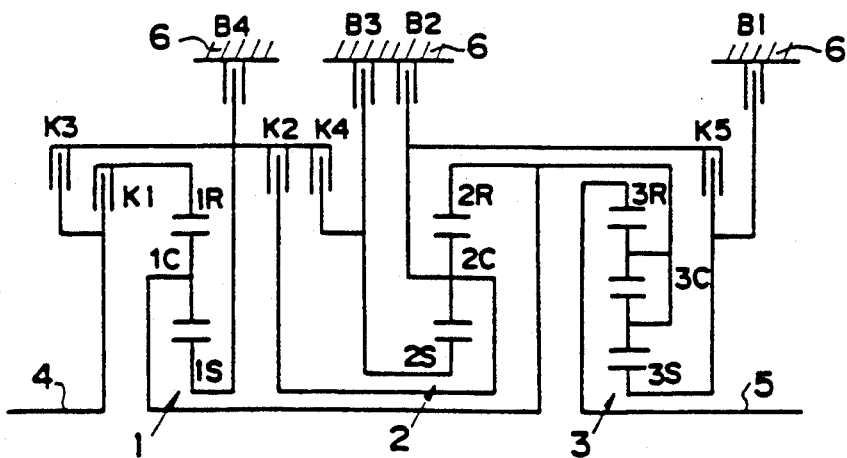

The example shown in FIG. 14 is modified from the aforementioned structure of FIG. 12 by changing the third planetary gear set 3 into a double pinion type planetary gear set and accordingly by connecting the carrier 3C of the third planetary gear set 3 to the ring gear 2R of the second planetary gear set 2 and connecting the ring gear 3R of the third planetary gear set 3 to the output shaft 5. The remaining structure is left similar to that shown in FIG. 12.

The automatic transmissions having the structures shown in FIGS. 12 to 14 can achieve both the speed changes shown in Table 26 and the engagement/release patterns of the frictional engagement means for setting the same speed stages. In case, moreover, the input numbers of revolutions of the rotary members of the individual planetary gear sets 1, 2 and 3 are set at "1", the numbers of revolutions are tabulated in Table 27. Here, the numbers of revolutions appearing in Table 27 take values for the gear ratios of $\rho 1 = 0.450$, $\rho 2 = 0.569$ and $\rho 3 = 0.405$, in case the individual planetary gear sets 1, 2 and 3 are of single-pinion types, for the gear ratio of $\rho 1 = 0.310$, in case the first planetary gear set 1 is of double-pinion type, and for the gear ratio of $\rho 3 = 0.280$ in case the third planetary gear set 3 is of double-pinion type.

TABLE 26

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 1st | ① | ○ | | | ○ | ○ | ○ | * | | |
| | ② | ○ | | | ○ | * | * | ○ | | |
| | ③ | ○ | | | ○ | * | ○ | ○ | | |
| 2nd a | ① | ○ | ○ | | | ○ | ○ | * | | * |
| | ② | ○ | ○ | | | ○ | * | ○ | | |
| | ③ | ○ | ○ | | | * | * | * | | ○ |
| | ④ | ○ | ○ | | | * | ○ | ○ | | * |
| | ⑤ | ○ | ○ | * | | | * | ○ | | ○ |
| | ⑥ | ○ | ○ | * | | ○ | * | | ○ | |
| b | ① | ○ | | | ○ | ○ | * | ○ | | |
| | ② | ○ | | | * | ○ | ○ | * | | ○ |
| 2. 2th | | ○ | ○ | | | ○ | ○ | | | |
| 2. 5th | ① | ○ | | | ○ | ○ | * | ○ | | |
| | ② | ○ | | | * | ○ | | | * | ○ |
| | ③ | ○ | | | * | ○ | | | ○ | ○ |
| 3rd a | ① | ○ | | ○ | | ○ | ○ | * | | |
| | ② | ○ | | ○ | | * | ○ | ○ | | |
| b | ① | ○ | | ○ | * | | ○ | | * | |
| c | ① | ○ | | ○ | | ○ | ○ | | | |
| | ② | ○ | | * | ○ | ○ | ○ | | | |
| | ③ | * | | ○ | ○ | ○ | ○ | | | |
| 3. 2th | | | ○ | ○ | | ○ | | | ○ | |
| 3. 5th | | | ○ | ○ | | ○ | | | ○ | |
| 4th | ① | ○ | | ○ | * | ○ | ○ | | | |
| | ② | ○ | | * | ○ | ○ | ○ | | | |
| | ③ | ○ | * | | ○ | ○ | ○ | | | |
| | ④ | * | ○ | | ○ | ○ | ○ | | | |
| 4. 5th | | | | ○ | ○ | ○ | ○ | | ○ | |
| 5th | | | | ○ | ○ | ○ | | | ○ | |
| Rev | ① | | | ○ | ○ | ○ | ○ | * | | |
| | ② | | | ○ | ○ | * | ○ | ○ | | |
| | ③ | | | ○ | ○ | * | ○ | ○ | | |

TABLE 27

| | | 1st planetary gear set | | | 2nd planetary gear set | | | 3rd planetary gear set | | |
|---|---|---|---|---|---|---|---|---|---|---|
| | | 1S | 1C | 1R | 2S | 2C | 2R | 3S | 3C | 3R |
| 1st | ① | | | | | | | | | |
| | ② | −0.78 | 0.45 | 1.00 | −0.78 | 0.00 | 0.45 | 0.00 | 0.32 | 0.45 |
| | ③ | | | | | | | | | |
| 2nd a | ① | | | | | | | | | |
| | ② | | | | | | | | | |
| | ③ | | | | * −1.21 | 0.00 | | | | |
| | ④ | 0.00 | 0.69 | 1.00 | | | 0.69 | 0.00 | 0.49 | 0.69 |
| | ⑤ | | | | | | | | | |
| | ⑥ | | | | | | | | | |
| b | ① | | | | 0.00 | 0.44 | | | | |
| | ② | | | | | | | | | |
| 2. 2th | | 0.54 | 0.86 | 1.00 | 0.00 | 0.45 | 0.86 | 0.00 | 0.61 | 0.86 |

TABLE 27-continued

| | | 1st planetary gear set | | | 2nd planetary gear set | | | 3rd planetary gear set | | |
|---|---|---|---|---|---|---|---|---|---|---|
| | | 1S | 1C | 1R | 2S | 2C | 2R | 3S | 3C | 3R |
| 2. 5th | ① ② ③ | 0.00 | 0.69 | 1.00 | 0.00 | 0.44 | 0.69 | 0.44 | 0.62 | 0.69 |
| 3rd a | ① ② | | | | −1.76 | 0.00 | | | | |
| b | | 1.00 | 1.00 | 1.00 | 0.00 | 0.51 | 1.00 | 0.00 | 0.71 | 1.00 |
| c | ① ② ③ | | | | 1.00 | 1.00 | | | | |
| 3. 2th | | 0.54 | 0.86 | 1.00 | 0.00 | 0.54 | 0.86 | 0.54 | 0.77 | 0.86 |
| 3. 5th | | 1.00 | 1.00 | 1.00 | 0.00 | 0.64 | 1.00 | 0.64 | 0.90 | 1.00 |
| 4th | ① ② ③ ④ | 1.00 | 1.00 | 1.00 | 1.00 | 1.00 | 1.00 | 1.00 | 1.00 | 1.00 |
| 4. 5th | | 1.00 | 1.57 | 1.83 | 0.00 | 1.00 | 1.57 | 0.00 | 1.12 | 1.57 |
| 5th | | 1.00 | 1.57 | 1.83 | 0.00 | 1.00 | 1.57 | 0.00 | 1.41 | 1.57 |
| Rev | ① ② ③ | 1.00 | −0.57 | −1.28 | 1.00 | 0.00 | −0.57 | 0.00 | −0.41 | −0.57 |

Even the aforementioned automatic transmissions having the structures shown in FIGS. 12 to 14 can set not only the main forward five speeds having gear ratios approximate to the geometric series but also the auxiliary speed stages such as the 2.2th speed and the 2.5th speed or the 3.2th speed and the 3.5th speed. As a result, the kinetic inertia energy to be absorbed can be reduced at the time of a shift between the main speed stages by passing through the auxiliary speed stages interposed between the main speed stages, and the shift can be executed with reduced shift shocks by decreasing the number of the frictional engagement means to have their engagement/release statuses switched, as will be exemplified in the following.

In case of the shift from the 1st to 5th speeds, the shift can be executed by way of the 2.5th speed and the 3.5th speed, as will be tabulated in the following in clutch and brake application charts in Tables 28 to 31.

TABLE 28

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 1st | ① | ○ | | | ○ | ○ | ○ | △ | | |
| 2. 5th | ② | ○ | | | ○ | ○ | | | ◉ | ○ |
| 3. 5th | | ○ | | ○ | | ○ | | | ○ | |
| 5th | | | ○ | ○ | | ○ | | | ○ | |

TABLE 29

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 1st | ② | ○ | · | | ○ | ○ | △ | ○ | | |
| 2. 5th | ② | ○ | | | ○ | ○ | | | ◉ | ○ |
| 3. 5th | | ○ | | ○ | | ○ | | | ○ | |
| 5th | | | ○ | ○ | | ○ | | | ○ | |

TABLE 30

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 1st | ① | ○ | | | ○ | ○ | ○ | △ | | |
| 2. 5th | ① | ○ | | | ○ | ○ | | | ○ | △ |
| 3. 5th | | ○ | | ○ | | ○ | | | ○ | |
| 5th | | | ○ | ○ | | ○ | | | ○ | |

TABLE 31

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 1st | ② | ○ | | | ○ | ○ | △ | ○ | | |
| 2. 5th | ① | ○ | | | ○ | ○ | | | ○ | △ |
| 3. 5th | | ○ | | ○ | | ○ | | | ○ | |
| 5th | | | ○ | ○ | | ○ | | | ○ | |

In case a shift is executed between the main speed stages in accordance with any of these Tables, the number of the frictional engagement means to have their engagement/release statuses switched substantially simultaneously is two or less. As could be seen from Table 27, moreover, the directions of changing the revolutions of the individual rotary members are not reversed in the course of the shift. Nor does the cumulative number of fluctuating revolutions exceed that of the case of the direct shift from the 1st to 5th speeds. If a jumping shift is to be executed for comparison by way of the engagement/release status of the pattern of the column a or c of the third speed, the direction of changing the revolutions of the sun gear 2S of the second planetary gear set 2 is reversed in the course of the shift.

On the other hand, the jumping shift from the 2nd to 5th speeds can be carried out by a method of passing the 2.5th speed and the 3.5th speed, a method of passing the 3rd speed and the 3.5th speed, and a method of passing the 3rd speed and the 4.5th speed. Specifically, examples of the clutch and brake application chart in case of passing the 2.5th speed and the 3.5th speed are tabulated in Tables 32 to 38. Examples of the clutch and brake application chart in case of passing the 3rd speed and the 3.5th speed are tabulated in Tables 39 to 42. Moreover, examples of the clutch and brake application chart in case of passing the 3rd speed and the 4.5th speed are tabulated in Tables 43 and 44.

TABLE 32

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 2nd | a | ③ | ○ | ○ | | | ○ | △ | △ | | ○ |
| 2. 5th | | ③ | ○ | | | △ | ○ | | | ○ | ○ |
| 3. 5th | | | ○ | | ○ | | ○ | | | ○ | |
| 5th | | | | ○ | ○ | | ○ | | | ○ | |

TABLE 33

| | | K1 | K2 | K3 | K4 | K5 | B1 | B2 | B3 | B4 |
|---|---|---|---|---|---|---|---|---|---|---|
| 2nd | a | ⑤ | ○ | △ | | | ◎ | ○ | △ | | ○ |
| 2.5th | | ③ | ○ | | | △ | ○ | | | | ○ |
| 3.5th | | | ○ | | ○ | | ○ | | | | ○ |
| 5th | | | | ○ | ○ | ○ | | | | | ○ |

TABLE 34

| | | K1 | K2 | K3 | K4 | K5 | B1 | B2 | B3 | B4 |
|---|---|---|---|---|---|---|---|---|---|---|
| 2nd | a | ③ | ○ | ○ | | | ○ | △ | △ | | ○ |
| 2.5th | | ③ | ○ | | | △ | ○ | | | | ○ |
| | | ③ | ○ | | ◎ | | ○ | | | | ○ |
| | | ① | ○ | | | | ○ | | | | △ |
| 3.5th | | | ○ | | ○ | | ○ | | | | ○ |
| 5th | | | | ○ | ○ | ○ | | | | | ○ |

TABLE 35

| | | K1 | K2 | K3 | K4 | K5 | B1 | B2 | B3 | B4 |
|---|---|---|---|---|---|---|---|---|---|---|
| 2nd | b | ① | ○ | | | | ○ | ○ | | ○ | △ |
| 2.5th | | ① | ○ | | | ○ | ○ | | | | △ |
| 3.5th | | | ○ | | ○ | | ○ | | | | ○ |
| 5th | | | | ○ | ○ | ○ | | | | | ○ |

TABLE 36

| | K1 | K2 | K3 | K4 | K5 | B1 | B2 | B3 | B4 |
|---|---|---|---|---|---|---|---|---|---|
| 2nd b ① | ○ | | | ○ | | ○ | | ○ | ◎ |
| 2.5th ③ | ○ | | | △ | ○ | | | | ○ |
| 3.5th | ○ | | ○ | | | ○ | | | ○ |
| 5th | | ○ | ○ | ○ | | | | | ○ |

TABLE 37

| | K1 | K2 | K3 | K4 | K5 | B1 | B2 | B3 | B4 |
|---|---|---|---|---|---|---|---|---|---|
| 2nd b ② | ○ | | | ◎ | | ○ | | ◎ | ○ |
| 2.5th ① | ○ | | | ○ | ○ | | | | △ |
| 3.5th | ○ | | ○ | | | ○ | | | ○ |
| 5th | | ○ | ○ | ○ | | | | | ○ |

TABLE 38

| | K1 | K2 | K3 | K4 | K5 | B1 | B2 | B3 | B4 |
|---|---|---|---|---|---|---|---|---|---|
| 2nd b ② | ○ | | | △ | | ○ | | ◎ | ○ |
| 2.5th ③ | ○ | | | △ | ○ | | | | ○ |
| 3.5th | ○ | | ○ | | | ○ | | | ○ |
| 5th | | ○ | ○ | ○ | | | | | ○ |

TABLE 39

| | K1 | K2 | K3 | K4 | K5 | B1 | B2 | B3 | B4 |
|---|---|---|---|---|---|---|---|---|---|
| 2nd a ⑤ | ○ | △ | | | △ | ○ | △ | | ○ |
| 3rd b | ○ | | ○ | | | ○ | | ◎ | |
| 3.5th | ○ | | ○ | | | ○ | | | ○ |
| 5th | | ○ | ○ | ○ | | | | | ○ |

TABLE 40

| | | K1 | K2 | K3 | K4 | K5 | B1 | B2 | B3 | B4 |
|---|---|---|---|---|---|---|---|---|---|---|
| 2nd | a | ⑤ | ○ | △ | | | △ | ○ | △ | | ○ |
| | | ⑤ | ○ | △ | | | △ | ○ | △ | | ○ |

TABLE 40-continued

| | K1 | K2 | K3 | K4 | K5 | B1 | B2 | B3 | B4 |
|---|---|---|---|---|---|---|---|---|---|
| 3rd b | ○ | | ○ | | | ○ | | ◎ | |
| 3.5th | ○ | | ○ | | | ○ | | | ○ |
| 5th | | ○ | ○ | ○ | | | | | ○ |

TABLE 41

| | K1 | K2 | K3 | K4 | K5 | B1 | B2 | B3 | B4 |
|---|---|---|---|---|---|---|---|---|---|
| 2nd b ① | ○ | | | ○ | | ○ | | ○ | △ |
| 3rd b | ○ | | ○ | | | ○ | | ◎ | |
| 3.5th | ○ | | ○ | | | ○ | | | ○ |
| 5th | | ○ | ○ | ○ | | | | | ○ |

TABLE 42

| | K1 | K2 | K3 | K4 | K5 | B1 | B2 | B3 | B4 |
|---|---|---|---|---|---|---|---|---|---|
| 2nd b ② | ○ | | △ | | | ○ | | ◎ | ○ |
| 3rd b | ○ | | ○ | | | ○ | | ◎ | |
| 3.5th | ○ | | ○ | | | ○ | | | ○ |
| 5th | | ○ | ○ | ○ | | | | | ○ |

TABLE 43

| | | K1 | K2 | K3 | K4 | K5 | B1 | B2 | B3 | B4 |
|---|---|---|---|---|---|---|---|---|---|---|
| 2nd a | ⑤ | ○ | △ | | △ | ○ | ◎ | | ○ |
| | ⑤ | ○ | △ | | △ | ○ | △ | | ○ |
| 3rd b | ○ | | ○ | | | ○ | | ◎ | |
| 4.5th | | ○ | ○ | | | ○ | | | ○ |
| 5th | | ○ | ○ | ○ | | | | | ○ |

TABLE 44

| | | K1 | K2 | K3 | K4 | K5 | B1 | B2 | B3 | B4 |
|---|---|---|---|---|---|---|---|---|---|---|
| 2nd | b | ① | ○ | | | ○ | | ○ | | ○ | △ |
| 3rd | b | | ○ | | ○ | | | ○ | | ◎ | ○ |
| 4.5th | | | | ○ | ○ | | | ○ | | | ○ |
| 5th | | | | ○ | ○ | ○ | | | | | ○ |

In the shifts according to these clutch and brake application charts, the directions of changing the revolutions of the rotary members are not reversed. If, on the contrary, the pattern of the column a or c is adopted for the 3rd speed, there is caused like the foregoing examples a disadvantage that the number of revolutions of the sun gear 2S of the second planetary gear set 2 is excessively augmented in a negative or positive direction.

In case of the shift from the 3rd to 5th speeds, a plurality of auxiliary speed stages such as the 3.5th speed or the 4.5th speed are interposed between those main speed stages. In the automatic transmission of the present invention, therefore, one of the auxiliary speed stages such as the 4.5th speed is passed to execute the shift to the 5th speed. The clutch and brake application chart for this shift is exemplified in Table 45.

TABLE 45

| | K1 | K2 | K3 | K4 | K5 | B1 | B2 | B3 | B4 |
|---|---|---|---|---|---|---|---|---|---|
| 3rd c ① | ○ | | ○ | △ | | ○ | | | |
| 4.5th | | ○ | ○ | | | ○ | | | ○ |
| 5th | | ○ | ○ | ○ | | | | | ○ |

If a shift according to this Table 45 is executed, the directions of changing the revolutions of the rotary members are neither reversed, nor is increased the cumulative number of the fluctuating revolutions. Moreover, the number of the frictional engagement means to have their engagement/release statuses switched substantially simultaneously can be suppressed to two or less.

In case of a shift from the 2nd to 4th speeds, moreover, there is a method of passing the 2.5th speed or the 3.2th speed, as will be exemplified in clutch and brake application charts in Tables 46 to 48.

TABLE 46

| | Clutch Means | | | | | Brake Means | | | |
|---|---|---|---|---|---|---|---|---|---|
| | K1 | K2 | K3 | K4 | K5 | B1 | B2 | B3 | B4 |
| 2nd a | ⑥ ○ | △ | | | | ○ | △ ○ | | ○ |
| 2.5th | ③ ○ | | | | △ | ○ | | ○ | ○ |
| | ③ ○ | | | | ⊙ | ○ | | ○ | ○ |
| | ① ○ | | | | | ○ | | ○ | △ |
| 4th | ③ ○ | △ | ○ | ○ | ○ | | | | |

TABLE 47

| | Clutch Means | | | | | Brake Means | | | |
|---|---|---|---|---|---|---|---|---|---|
| | K1 | K2 | K3 | K4 | K5 | B1 | B2 | B3 | B4 |
| 2nd a ① | ○ | | | ○ | | ○ | | ○ | △ |
| 2.5th ① | ○ | | | ○ | ○ | | | ○ | △ |
| 4th ③ | ○ | △ | ○ | ○ | ○ | | | | |

TABLE 48

| | Clutch Means | | | | | Brake Means | | | |
|---|---|---|---|---|---|---|---|---|---|
| | K1 | K2 | K3 | K4 | K5 | B1 | B2 | B3 | B4 |
| 2nd a ② | ○ | | | △ | | ○ | | ⊙ | ○ |
| 3.2th | ○ | ○ | | | ○ | | | ○ | |
| 4th ① | ○ | ○ | ○ | △ | ○ | | | | |

If the shift is executed according to any of these Tables, the directions of changing the revolutions of the rotary members are not reversed, and the number of the frictional engagement means to have their engagement/release statuses switched substantially simultaneously can be suppressed to two or less. In this case, too, it is also undesirable for the aforementioned reasons to pass the pattern of the column a for the 3rd speed.

The present invention can be applied to not only the automatic transmissions, which are improved in the various manners from the foregoing automatic transmission having the structure shown in FIGS. 2 or 3, but also the automatic transmissions which are improved in the various manners from the foregoing automatic transmissions having the structures shown in FIGS. 12 to 14, as will be exemplified in the following.

Figure 15:
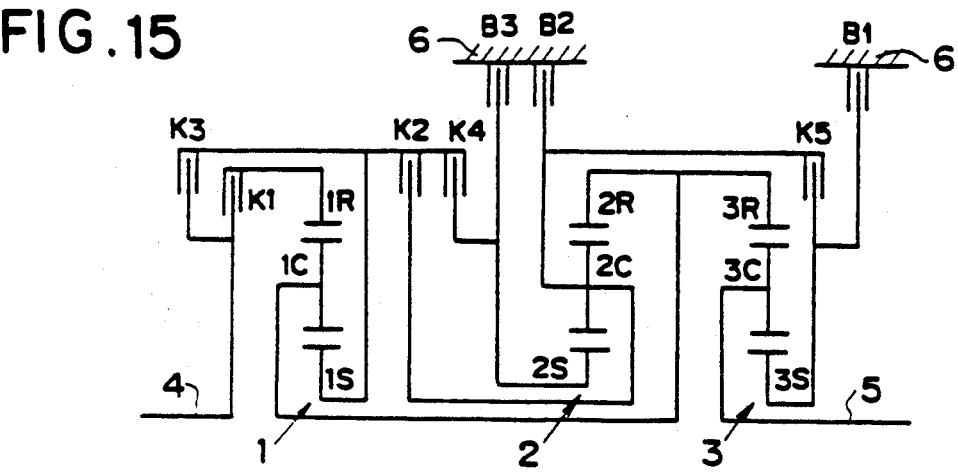
Figure 16:
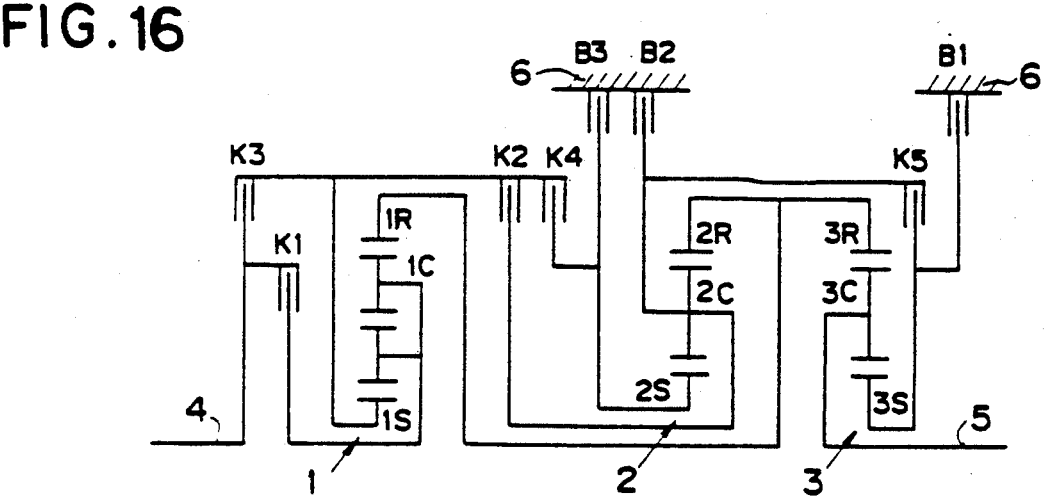
Figure 17:
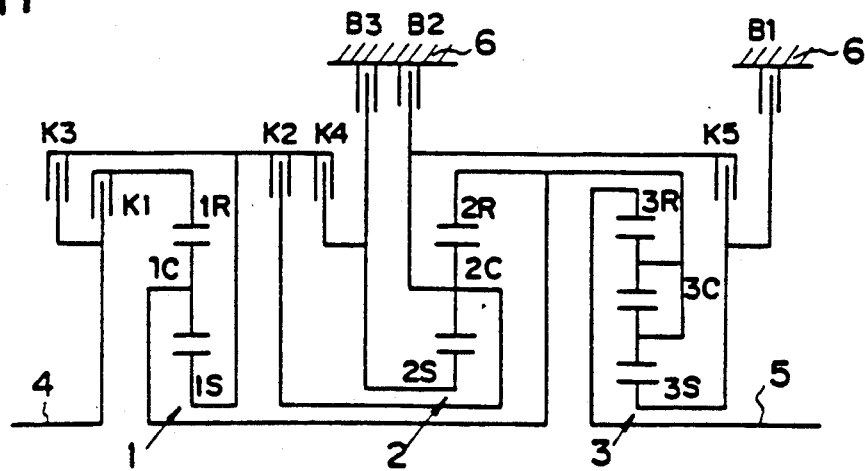

In the examples shown in FIGS. 15 to 17, the fourth brake means B4 is eliminated. More specifically, the automatic transmission having the structure shown in FIG. 15 is constructed by eliminating the fourth brake means B4 from the structure shown in FIG. 12. Moreover, the automatic transmission having the structure shown in FIG. 16 is constructed by eliminating the fourth brake means B4 from the structure shown in FIG. 13. Still moreover, the automatic transmission having the structure shown in FIG. 17 is constructed by eliminating the fourth brake means B4 from the structure shown in FIG. 14.

For these automatic transmissions, too, the present invention can be put into practice. In this case, the shift controls may follow such clutch and brake application charts of the foregoing Tables 28 to 48 as can be executed with the fourth brake means B4 being released at all times. For example, the shift from the 1st to 5th speeds may follow Table 30 or 31. The shift from the 2nd to 5th speeds may follow any of the Tables 35, 41 and 42. Moreover, the shift from the 2nd to 4th speeds may follow the Table 47.

Figure 18:
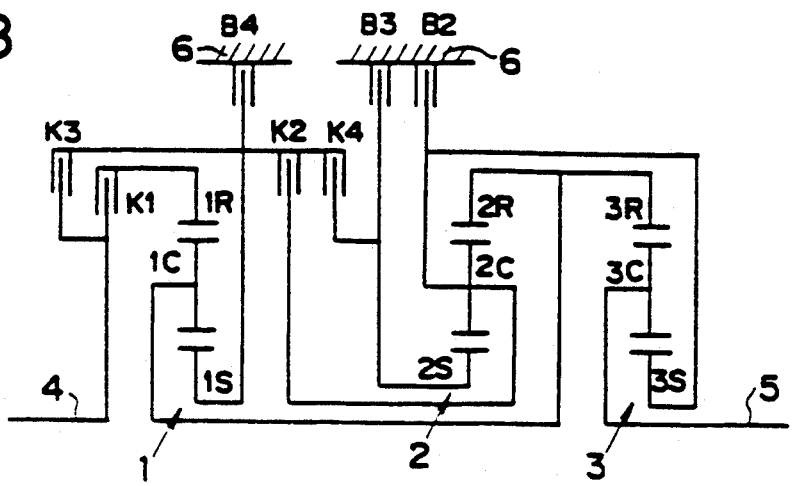
Figure 19:
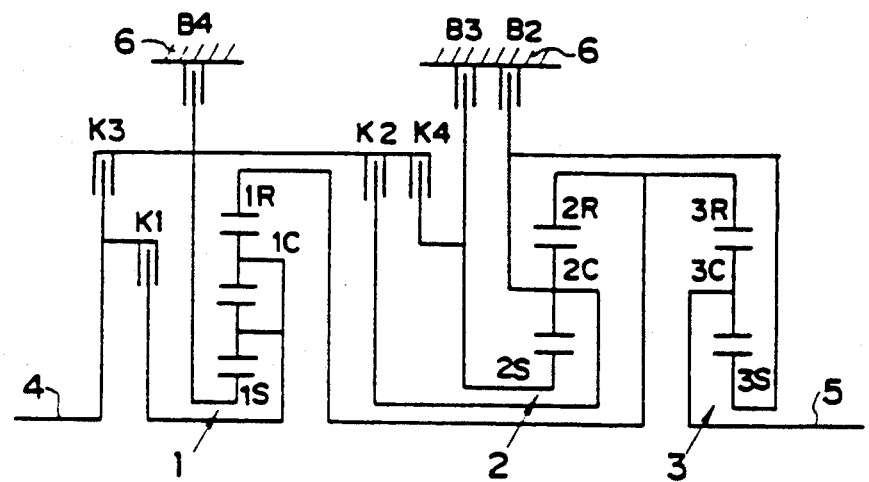
Figure 20:
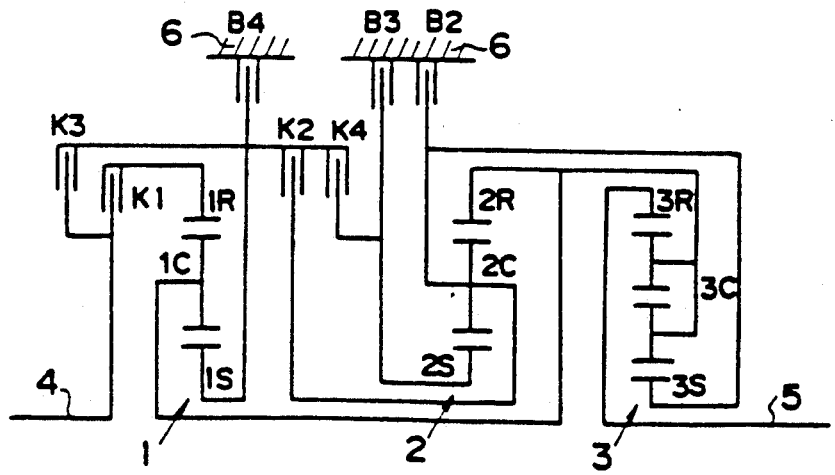

A shift control making effective use of the auxiliary speed stages can be executed, too, even in the automatic transmissions equipped with neither the fifth clutch means K5 nor the first brake means B1, as will be described in the following. The structure shown in FIG. 18 is modified from that shown in FIG. 12 such that the fifth clutch means K5 is eliminated to connect the carrier 2C of the second planetary gear set 2 and the sun gear 3S of the third planetary gear set 3 at all times, and such that the first brake means B1 is eliminated. Moreover, the structure shown in FIG. 19 is likewise constructed by eliminating the fifth clutch means K5 and the first brake means B1 from the structure shown in FIG. 13. Still moreover, the structure shown in FIG. 20 is constructed by eliminating the fifth clutch means K5 and the first brake means B1 from the structure shown in FIG. 21.

In the automatic transmissions having these structures, too, the jumping shift from the 1st to 5th speed may follow the Table 39 or 31. Moreover, the jumping shift from the 2nd to 5th speeds may follow the Table 32 or 34. Still moreover, the shift from the 2nd to 4th speeds may follow the Table 46.

Figure 21:
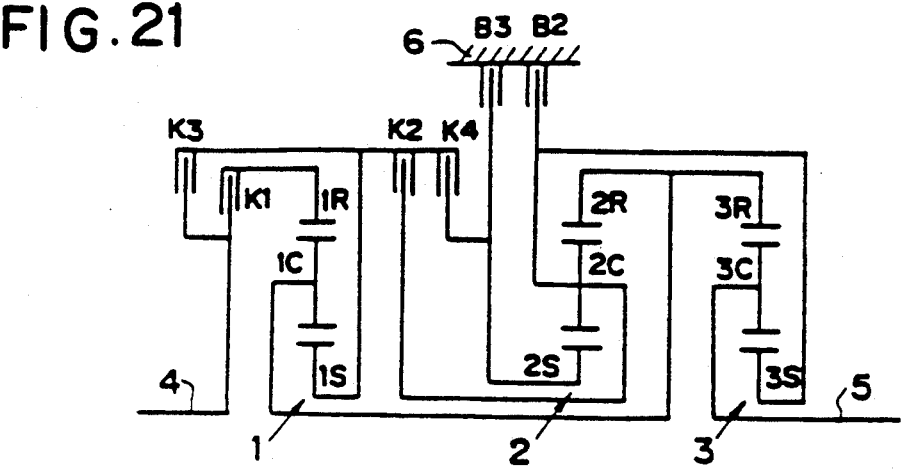
Figure 22:
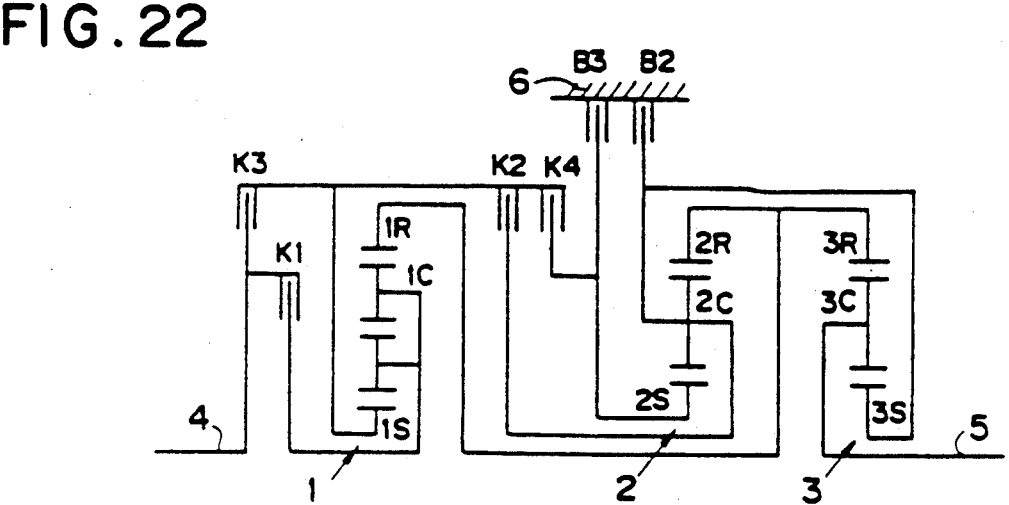
Figure 23:
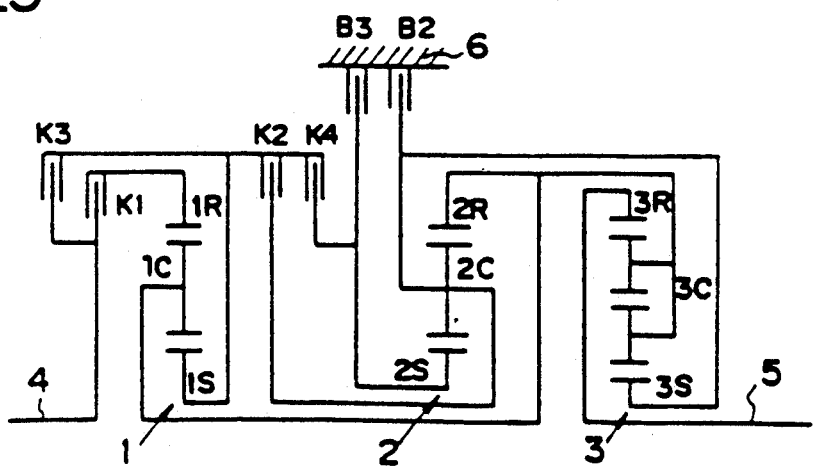

In the automatic transmissions having the structure made by eliminating the fifth clutch means K5 and the first and forth brake means B1 and B4 from the structures shown in FIGS. 12 to 14, too, a shift making effective use of the auxiliary speed stages can be carried out, as will be described with reference to FIGS. 21 to 23. Specifically, the structure shown in FIG. 21 is modified from that shown in FIG. 12 such that the fifth clutch means K5 is eliminated to connect the carrier 2C of the second planetary gear set 2 and the sun gear 3S of the third planetary gear set 3 at all times and such that the first and fourth brake means B1 and B4 are eliminated. Moreover, the structure shown in FIG. 22 is modified from that shown in FIG. 13 such that the fifth clutch means K5 and the first and fourth brake means B1 and B4 are eliminated. Still moreover, the structure shown in FIG. 23 is modified from that shown in FIG. 14 such that the fifth clutch means K5 and the first and fourth brake means B1 and B4 are eliminated.

In these automatic transmissions, too, such clutch and brake application charts of the foregoing Tables 28 to 48 as engage the fifth clutch means K5 at all times and release the first brake means B1 and the fourth brake means B4 at all times may be adopted in case of a shift passing the auxiliary speed stages. Specifically, the shift control according to Table 31 may be executed in case of the jumping shift from the 1st to 5th speeds.

Several examples of the automatic transmissions, to which the present invention can be applied, will be described in the following. The automatic transmission shown in FIG. 24 uses single-pinion type planetary gear sets as the first and third planetary gear sets 1 and 3 and a double-pinion type planetary gear set as the second planetary gear set 2. Of these planetary gear sets, the individual ring gears 1R, 2R and 3R are connected to rotate integrally, and the carrier 1C of the first planetary gear set 1 and the carrier 2C of the second planetary gear set 2 are connected to each other and to the sun gear 3S of the third planetary gear set 3 through the fourth clutch means K4. The first clutch means K1 is interposed between the input shaft 4 and the sun gear 2S of the second planetary gear set 2, and the second clutch means K2 is interposed between the input shaft 4 and the carrier 2C of the second planetary gear set 2. Moreover, the third clutch means K3 is interposed between the input shaft 4 and the sun gear 1S of the first planetary gear set 1. On the other hand, the brake means are exemplified by: the first brake means B1 for stopping the revolutions of the sun gear 3S of the third planetary gear set 3 selectively; the second brake means B2 for stopping the revolutions of the carriers 1C and 2C of the first planetary gear set 1 and the second planetary gear set 2, which in turn are connected to each other; and the third brake means B3 for stopping the revolutions of the sun gear 1S of the first planetary gear set 1 selectively. Moreover, the output shaft 5 is connected to the carrier 3C of the third planetary gear set 3.

Figure 24:
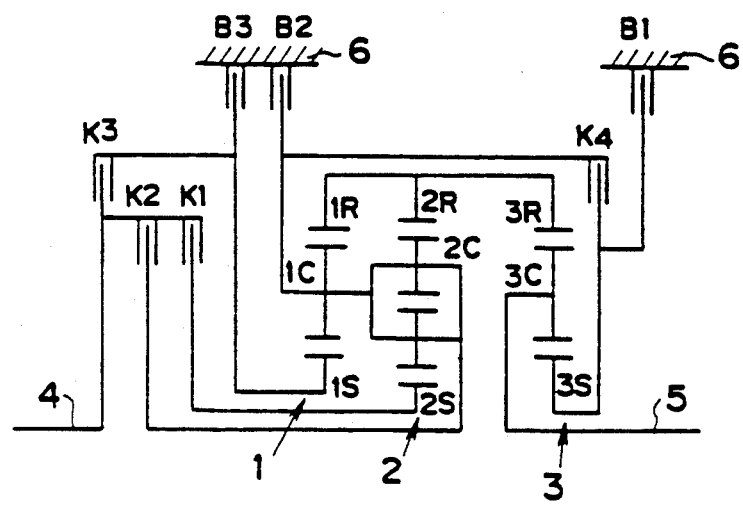
Figure 25:
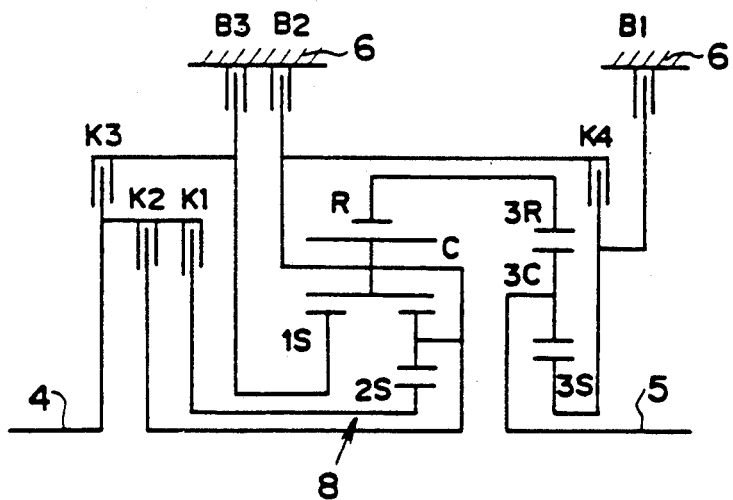

The structure shown in FIG. 25 is modified from the aforementioned one shown in FIG. 24 by changing the first planetary gear set 1 and the second planetary gear set 2 into a Ravignaux type planetary gear set 8. Specifically, this Ravignaux type planetary gear set 8 is composed of a ring gear R, a pinion gear meshing with the first sun gear 1S, another pinion gear meshing with the first-named pinion gear and the second sun gear 2S, and a carrier C supporting the pinion gears. The ring gear R is connected to the ring gear 3R of the third planetary gear set 3, and the carrier C is connected through the fourth clutch means K4 to the sun gear 3S of the third planetary gear set 3. Moreover, the first sun gear 1S is connected through the third clutch means K3 to the input shaft 4, and the second sun gear 2S is connected through the second clutch means K2 to the input shaft 4. The carrier C is connected through the first clutch means K1 to the input shaft 4. The output shaft 5 is connected to the carrier 3C of the third planetary gear set 3. On the other hand, the brake means are exemplified by: the first brake means B1 for stopping the revolutions of the sun gear 3S of the third planetary gear set 3 selectively; the second brake means B2 for stopping the revolutions of the carrier C of the Ravignaux type planetary gear set 8 selectively; and the third brake means B3 for stopping the revolutions of the aforementioned first sun gear 1S selectively.

The automatic transmission having the structures shown in FIGS. 24 or 25 can take both the speed stages tabulated in Table 49 and a plurality of engagement-/release patterns of the frictional engagement means for setting the individual speed stages. Moreover, the numbers of revolutions are tabulated in Table 50 in case the number of input revolutions of the rotary members of the individual planetary gear sets 1, 2 and 3 is set at "1". Incidentally, the numbers of revolutions enumerated in the Table 50 correspond to the case in which the planetary gear sets 1, 2 and 3 have gear ratios of $\rho1=0.569$, $\rho2=0.446$ and $\rho3=0.405$, respectively.

TABLE 49

|  |  | Clutch Means |  |  |  | Brake Means |  |  |
|---|---|---|---|---|---|---|---|---|
|  |  | K1 | K2 | K3 | K4 | B1 | B2 | B3 |
| 1st | ① | O |  |  |  | O | • |  |
|  | ② | O |  |  | O | • | O |  |
|  | ③ | O |  |  | • | O | O |  |
| 2nd |  | O |  |  |  |  | O | O |
| 2.5th |  | O |  |  | O |  | O | O |
| 3rd | ① | O | O | • |  | O |  |  |
|  | ② | O | • | O |  | O |  |  |
|  | ③ | • | O | O |  | O |  |  |
| 4th | ① | O | O |  | • | O |  |  |
|  | ② | O | • |  | O | O |  |  |
|  | ③ | • | O |  | O | O |  |  |
| 4.5th |  |  | O |  |  |  |  | O |
| 5th |  |  | O |  | O |  |  | O |
| Rev | ① | O |  | O | O | O | • |  |
|  | ② |  |  | O | O | • | O |  |
|  | ③ |  |  | O | • |  | O | O |

TABLE 50

|  | 1st Planetary Gear Set | | | 2nd Planetary Gear Set | | | 3rd Planetary Gear Set | | |
|---|---|---|---|---|---|---|---|---|---|
|  | 1S | 1C | 1R | 2S | 2C | 2R | 3S | 3C | 3R |
| 1st | −0.78 | 0.00 | −0.45 | 1.00 | 0.00 | 0.45 | 0.00 | 0.32 | 0.45 |
| 2nd | 0.00 | 0.44 | 0.69 | 1.00 | 0.44 | 0.69 | 0.00 | 0.49 | 0.69 |
| 2.5th | 0.00 | 0.44 | 0.69 | 1.00 | 0.44 | 0.69 | 0.44 | 0.62 | 0.69 |
| 3rd | 1.00 | 1.00 | 1.00 | 1.00 | 1.00 | 1.00 | 0.00 | 0.71 | 1.00 |
| 4th | 1.00 | 1.00 | 1.00 | 1.00 | 1.00 | 1.00 | 1.00 | 1.00 | 1.00 |
| 4.5th | 0.00 | 1.00 | 1.57 | 2.28 | 1.00 | 1.57 | 0.00 | 1.12 | 1.57 |
| 5th | 0.00 | 1.00 | 1.57 | 2.28 | 1.00 | 1.57 | 1.00 | 1.41 | 1.57 |
| Rev | 1.00 | 0.00 | −0.57 | −1.28 | 0.00 | −0.57 | 0.00 | −0.41 | −0.57 |

Even the automatic transmission having the aforementioned structure shown in FIGS. 24 or 25 can set not only the main forward five speeds having gear ratios in a relation approximate to the geometric series but also the auxiliary speed stages such as the 2.2th speed or the 4.5th speed. As a result, a plurality of auxiliary speed stages may exist in case of the jumping shift of not only three or more stages but also two stages. In this case, the automatic transmission of the present invention is enabled to execute a shift of few shift shocks by reducing the rotational fluctuations and decreasing the number of the frictional engagement means to have their engagement/release statuses switched, as will be described in the following.

Specifically, a shift from the 1st to 5th speeds can be executed either through the 2nd speed and the 4.5th speed or through the 2.5th speed, as will be enumerated in clutch and brake application charts in Tables 51 to 53.

TABLE 51

|  |  | Clutch Means |  |  |  | Brake Means |  |  |
|---|---|---|---|---|---|---|---|---|
|  |  | K1 | K2 | K3 | K4 | B1 | B2 | B3 |
| 1st | ③ | O |  |  | △ | O | O |  |
| 2nd |  | O |  |  |  |  | O | O |
| 4.5th |  |  | O |  |  |  |  | O |
| 5th |  |  | O |  | O |  |  | O |

TABLE 52

|  |  | Clutch Means |  |  |  | Brake Means |  |  |
|---|---|---|---|---|---|---|---|---|
|  |  | K1 | K2 | K3 | K4 | B1 | B2 | B3 |
| 1st | ① | O |  |  |  | O | △ |  |
| 2.5th |  | O |  |  | O |  |  | O |

TABLE 52-continued

|  | Clutch Means | | | | Brake Means | | |
| --- | --- | --- | --- | --- | --- | --- | --- |
|  | K1 | K2 | K3 | K4 | B1 | B2 | B3 |
| 5th |  |  | ◯ |  | ◯ |  | ◯ |

TABLE 53

|  | Clutch Means | | | | Brake Means | | |
| --- | --- | --- | --- | --- | --- | --- | --- |
|  | K1 | K2 | K3 | K4 | B1 | B2 | B3 |
| 1st | ② | ◯ |  |  | ◯ | △ | ◯ |
| 2.5th |  | ◯ |  |  | ◯ |  | ◯ |
| 5th |  |  | ◯ |  | ◯ |  | ◯ |

In case of the jumping shift according to any of these Tables, the number of the frictional engagement means to have their engagement/release statuses switched substantially simultaneously is two or less. As could be seen from Table 50, moreover, the directions of changing the revolutions of the individual rotary members are not reversed in the course of the shift. In case of the shift passing through the 3rd speed and the 4th speed for comparison, the directions of changing the revolutions of the sun gear of the first planetary gear set 1 (or the aforementioned first sun gear) and the sun gear 3S of the third planetary gear set 3 are reversed in the course of the shift so that the kinetic inertia energy to be absorbed as the shift proceeds is accordingly increased.

In case of the jumping shift from the 2nd to 5th speeds, moreover, the shift is executed through the 2.5th speed, as will be exemplified in a clutch and brake application chart in Table 54.

TABLE 54

|  | Clutch Means | | | | Brake Means | | |
| --- | --- | --- | --- | --- | --- | --- | --- |
|  | K1 | K2 | K3 | K4 | B1 | B2 | B3 |
| 2nd | ◯ |  |  |  | ◯ |  | ◯ |
| 2.5th | ◯ |  |  |  |  | ◯ | ◯ |
| 5th |  |  | ◯ |  | ◯ |  | ◯ |

The jumping shift according to this clutch and brake application chart is freed from reversing the directions of changing the revolutions of the rotary members. In case the 3rd or 4th speed, for example, is passed, on the contrary, the direction of changing the revolutions of the sun gear 1S of the first planetary gear set 1 (or the aforementioned first sun gear) is reversed in the course of the shift so that the kinetic inertia energy to be absorbed as the shift proceeds, thus raising a disadvantage in the reduction of the shift shocks.

In case of a shift from the 2nd to 4th speeds, moreover, there is a method of passing the 2.5th speed, as will be exemplified in clutch and brake application charts in Table 55 and 56.

TABLE 55

|  | Clutch Means | | | | Brake Means | | |
| --- | --- | --- | --- | --- | --- | --- | --- |
|  | K1 | K2 | K3 | K4 | B1 | B2 | B3 |
| 2nd |  | ◯ |  |  | ◯ |  | ◯ |
| 2.5th |  | ◯ |  | ◯ |  |  | ◯ |
| 4th | ① | ◯ | ◯ | △ | ◯ |  |  |

TABLE 56

|  | Clutch Means | | | | Brake Means | | |
| --- | --- | --- | --- | --- | --- | --- | --- |
|  | K1 | K2 | K3 | K4 | B1 | B2 | B3 |
| 2nd | ◯ |  |  |  | ◯ |  | ◯ |
| 2.5th | ◯ |  |  | ◯ |  |  | ◯ |

TABLE 56-continued

|  | Clutch Means | | | | Brake Means | | |
| --- | --- | --- | --- | --- | --- | --- | --- |
|  | K1 | K2 | K3 | K4 | B1 | B2 | B3 |
| 4th | ② | ◯ | △ | ◯ | ◯ |  |  |

If the jumping shift is to be carried out according to either of the clutch and brake application charts, the directions of changing the revolutions of the rotary members are not reversed, and the number of the frictional engagement means to have their engagement/release statuses switched substantially simultaneously can be suppressed to two or less. In this case, too, the passage through the 3rd speed is not preferable for the aforementioned reasons.

In the embodiment shown in FIG. 2, the engagement/release patterns of the frictional engagement means according to the aforementioned individual clutch and brake application charts are stored in advance as data, which are read out on the basis of a shift instruction to execute the shift by way of predetermined auxiliary speed stages. In the automatic transmission of the present invention, however, the shift can be executed by the following method in place of such structure. Specifically, all the engagement/release patterns of each of the speed stages, as enumerated in the Table 1, 26 or 49. In case the target speed stage based upon a shift instruction has an auxiliary speed stage in the course thereto, this auxiliary speed stage to be passed is decided under the conditions such as the reversal of the directions of changing the revolutions of the rotary members or the number of the frictional engagement means to have their engagement/release statuses switched substantially simultaneously. This method will be briefly described with reference to the flow chart of FIG. 26. According to this flow chart, the vehicle speed V, the throttle opening θ and the present speed stage Gs are read in (at Step 1). It is then decided (at Step 2) whether or not a target speed stage Ga to be determined on the basis of the vehicle speed V and the throttle opening θ is identical to the present speed stage Gs. The routine is returned upstream of the Step 1, if the result is "YES", and is advanced, if "NO", to Step 3, at which it is decided whether or not the shift is simultaneous. Here, the simultaneous shift provides a shift pattern, according to which the number of the frictional engagement means to have their engagement/release statuses switched substantially simultaneously for achieving the target speed stage is three or more. If not the simultaneous shift, i.e., if the decision result is "NO", the routine proceeds to Step 4, at which an instruction to effect the shift to the target speed stage Ga promptly is outputted. In case the shift to the target speed stage Ga is the simultaneous one, i.e., in case the decision result at the Step 3 is "YES", it is decided whether or not the cumulative number of the revolutions of the rotary members is minimized in case of passing a predetermined speed stage Gm including an auxiliary one of the intermediate speed stages between the present speed stage Gs and the target speed stage Ga. Here, the cumulative number of fluctuating revolutions is the sum of the absolute values of the numbers of changing the revolutions. If the direction of changing the revolutions is reversed, the cumulative number is augmented. In the example shown in FIG. 26, therefore, the reversal of the direction of changing the revolutions is decided by using the cumulative number of fluctuating revolutions as an index. In case the decision result is "NO", the scanning procedure is returned to just upstream, and a similar decision is executed again to determine (at Step 5) the intermediate speed stage Gm, at which the cumulative number of fluctuating revolutions of the rotary members is minimized. If the decision result of the Step 5 is "YES", it is decided at a subsequent Step 6 whether or not the shift to pass the intermediate speed stage Gm is the simultaneous one. If the result is "YES", the routine is returned to upstream of the Step 5, at which similar decisions on another intermediate speed stage are repeated. If the decision result at Step 6 is "NO", on the contrary, what is executed is the shift passing the selected intermediate speed stage. Then, the obtained shift pattern has few rotational fluctuations of the rotary members and none of the simultaneous shift. At Step 7, therefore, a shift instruction to effect a shift from the present speed stage Gs to the target speed stage Ga by way of the selected intermediate speed stage Gm is outputted to the automatic transmission.

In the examples thus far described, the shifts are executed by way of the auxiliary speed stages which are not used for the ordinary run. In case of the so-called "jumping shift" between the two or more separate main speed stages, the main one or ones between the present speed stage and the target speed stage can be effectively used to decrease the cumulative number of fluctuating revolutions and to reduce the number of the frictional engagement means to be switched to two or less.

Figure 26:
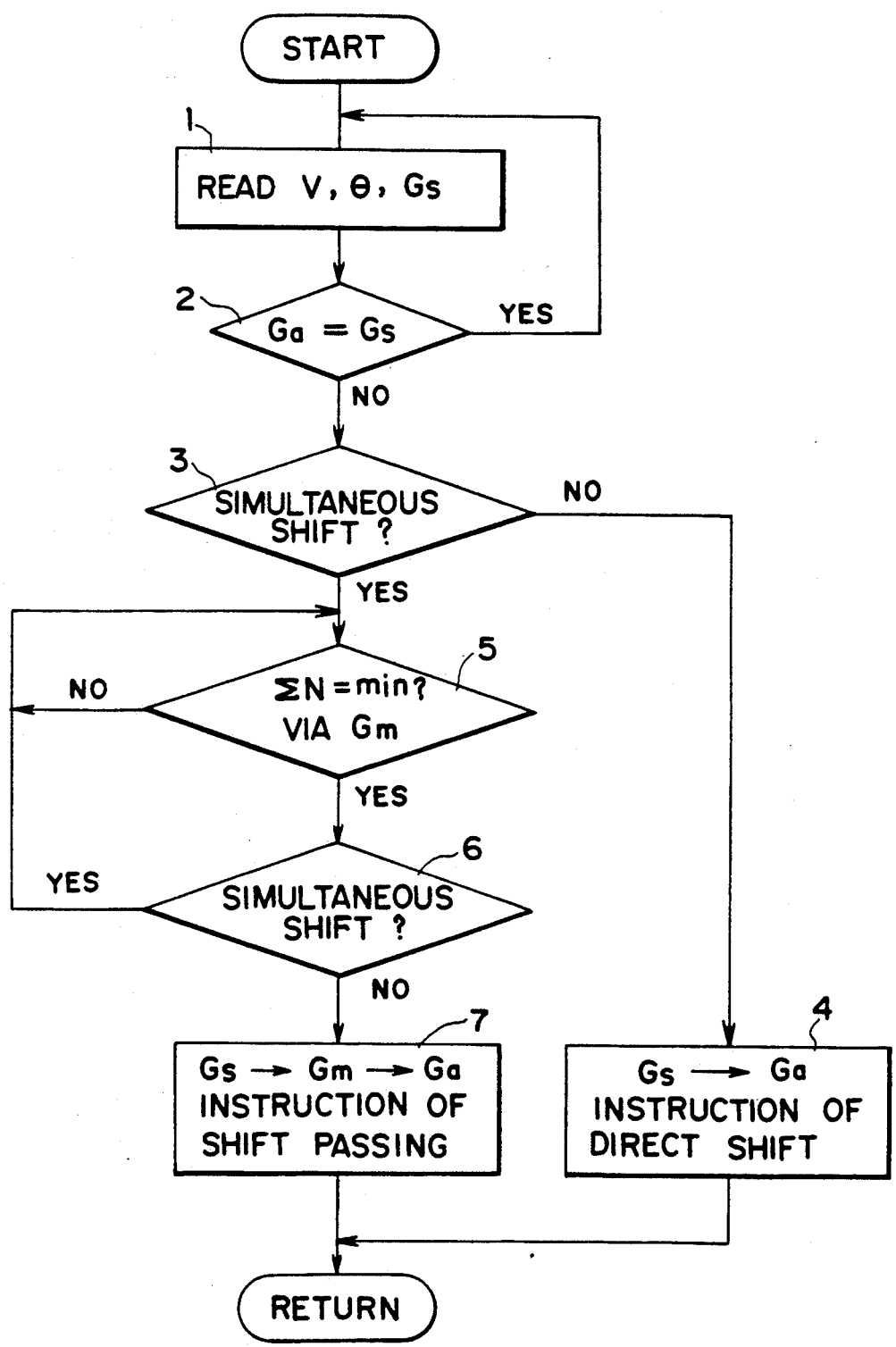
FIG. 26 is a flow chart for explaining a jumping shift control method.
Figure 27:
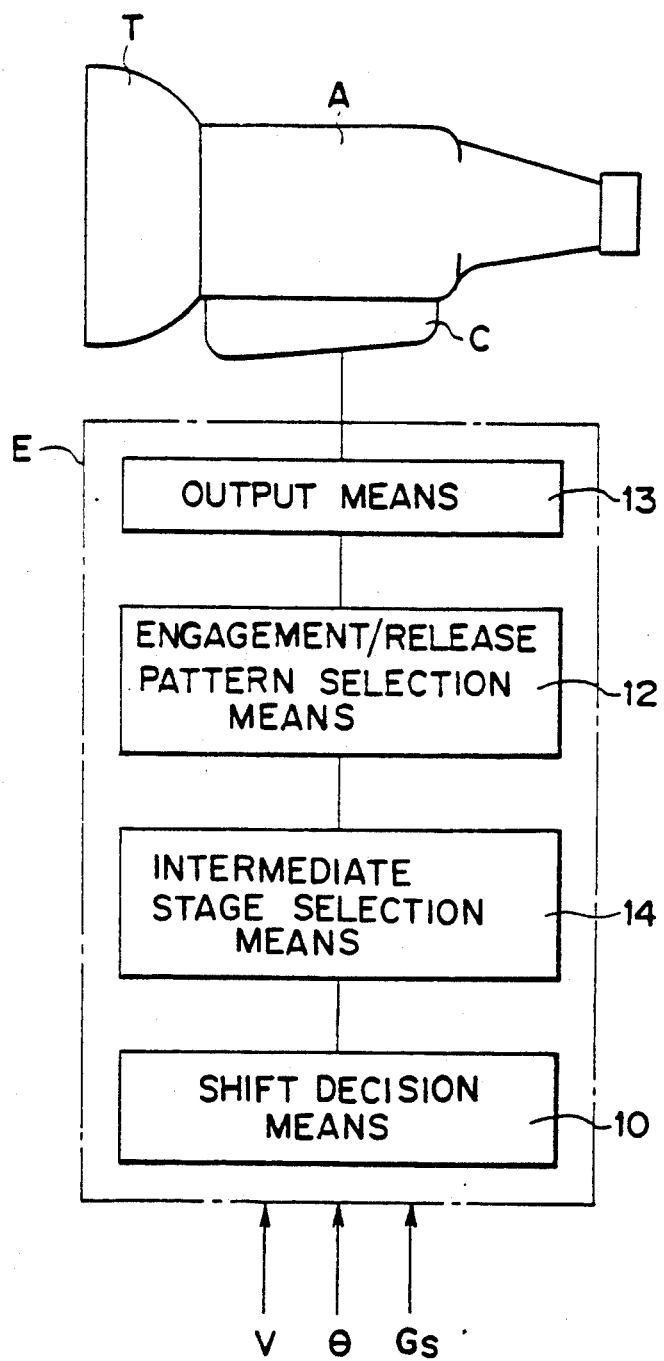
FIG. 27 is a block diagram showing a basic structure of another embodiment.

This shift control may follow the aforementioned procedure shown in FIG. 26, and the system therefor is exemplified in FIG. 27. Specifically, the system shown in FIG. 27 is constructed by changing the auxiliary speed stage selection means 11 shown in FIG. 1 into intermediate stage selection means 14. This intermediate stage selection means 14 selects such an intermediate main speed stage as can decrease the number of the frictional engagement means to have their engagement/release statuses to two or less and can minimize the cumulative number of the fluctuating revolutions of the rotary members, in case the shift decided by the shift decision means 10 is the jumping shift between the main speed stages. Moreover, the engagement/release pattern selection means 12 selects both the engagement/release pattern for setting that intermediate stage and the engagement/release pattern for setting the target main speed stage.

In case the shift from the 2nd to 5th speeds is jumped in the automatic transmission having the gear train shown in FIG. 2 or 3, examples passing intermediate main speed stages are exemplified in clutch and brake application charts in Tables 57 to 62.

TABLE 57

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | a | ⑤ | ○ | △ |  | △ | ○ | △ |  | ○ |
| 3rd | b |  | ○ |  | ○ |  | ○ |  | ◉ |  |
| 5th | b |  | ◉ | ○ | ○ |  |  |  | ○ |  |

TABLE 58

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | a | ⑤ | ○ | △ |  | △ | ○ | △ |  | ○ |
| 3rd | b |  | ○ |  | ○ |  | ○ |  | ◉ |  |
| 5th | c |  |  | ○ | ○ |  | ◉ |  | ○ |  |

TABLE 59

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd b | ○ |  | ○ |  |  | ○ |  | ◉ |  |
| 5th b | ◉ | ○ | ○ |  |  |  |  | ○ |  |

TABLE 60

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ② | ○ |  |  | △ |  | ○ |  | ◉ | ○ |
| 3rd b | ○ |  | ○ |  |  | ○ |  | ◉ |  |
| 5th b | ◉ | ○ | ○ |  |  |  |  | ○ |  |

TABLE 61

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd b | ○ |  | ○ |  |  | ○ |  | ◉ |  |
| 5th c |  |  | ○ | ○ |  | ◉ | ○ | ○ |  |

TABLE 62

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ② | ○ |  |  | △ |  | ○ |  | ◉ | ○ |
| 3rd b | ○ |  | ○ |  |  | ○ |  | ◉ |  |
| 5th c |  |  | ○ | ○ |  | ◉ |  | ○ |  |

In case of the jumping shift from the 3rd to 5th speeds, the shift is executed by way of the 4th speed. The engagement/release patterns of the frictional engagement means in this case are exemplified in Tables 63 and 64.

TABLE 63

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 3rd | c |  | ○ |  | ○ | ◉ | ○ |  |  |  |
| 4th | a | ① | ◉ | ○ | ○ | ○ | △ |  |  |  |
|  |  | ① | △ |  | ○ | ○ | ◉ |  |  |  |
| 5th | a |  |  |  | ○ | ○ | ◉ |  |  | ○ |

TABLE 64

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 3rd | c | ○ |  | ○ | ◉ |  | ○ |  |  |  |
| 4th | b |  |  | ○ | ○ | ○ |  | ◉ | △ |  |
| 5th | a |  |  | ○ | ○ | △ |  |  |  | ○ |

An example of setting the 3rd speed temporarily at the time of the jumping shift from the 2nd to 4th speeds is tabulated in Table 65.

TABLE 65

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd c | ○ |  | ○ | ◉ |  | ○ |  |  |  |
| 4th a ④ | ○ | △ | ○ | ○ | ○ |  |  |  |  |

If the jumping shift is executed by setting the aforementioned main speed shifts temporarily as the intermediate stage, the number of the frictional engagement means to have their engagement/release statuses switched substantially simultaneously is decreased to two or less. As could be seen from the Table 2, moreover, the cumulative number of the fluctuating revolutions of any of the rotary members will not exceed the number of the fluctuating revolutions of the case of the direct shift bypassing the intermediate stage.

The jumping shift passing the intermediate main speed shift can also be executed in the automatic transmissions having the gear trains shown in FIGS. 12 to 14. The engagement/release patterns at the individual main speed stages to be selected in that case are enumerated in the following Tables.

The clutch and brake application charts of the case of the jumping shift from the 2nd to 4th speeds are exemplified in Tables 66 to 79.

TABLE 66

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd a ④ | ○ | ○ |  |  | △ | ○ | ○ |  | △ |
| 3rd c ② | ○ | ○ | △ | ○ |  | ○ |  |  |  |
| 4th ② | ○ | ○ | △ | ○ | ○ |  |  |  |  |

TABLE 67

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd c ② | ○ |  | ⊙ | ○ |  | ○ |  |  |  |
| 4th ① | ○ |  | ○ | ⊙ | ○ |  |  |  |  |

TABLE 68

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd c ② | ○ | ○ | △ | ○ |  | ○ |  |  |  |
| 4th ② | ○ | ○ | △ | ○ | ○ |  |  |  |  |

TABLE 69

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd c ② | ○ | ○ | ⊙ | ○ |  | ○ |  |  |  |
| 4th ③ | ○ | ⊙ | ○ | ○ | ○ |  |  |  |  |

TABLE 70

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd c ② | ○ | ○ | ⊙ | ○ |  | ○ |  |  |  |
| 4th ④ | ⊙ | ○ | ○ | ○ | ○ |  |  |  |  |

TABLE 71

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |
| 3rd c ① | ○ |  | ○ | ⊙ |  | ○ |  |  |  |
| 4th ③ | ○ |  | ○ | ○ | ○ |  |  |  |  |

TABLE 72

|  | Clutch Means | | | | | Brake Means | | | |
|---|---|---|---|---|---|---|---|---|---|
|  | K1 | K2 | K3 | K4 | K5 | B1 | B2 | B3 | B4 |
| 2nd b ① | ○ |  |  | ○ |  | ○ |  | ○ | △ |

TABLE 72-continued

|  | Clutch Means | | | | | Brake Means | | | |
|---|---|---|---|---|---|---|---|---|---|
|  | K1 | K2 | K3 | K4 | K5 | B1 | B2 | B3 | B4 |
| 3rd c ① | ○ |  | ○ | ⊙ |  | ○ |  |  |  |
| 4th ② | ○ | ○ | ⊙ | ○ | ○ |  |  |  |  |

TABLE 73

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | b | ① | ○ |  |  | ○ |  | ○ | ○ | △ |
| 3rd | c | ① | ○ |  | ○ | ⊙ |  | ○ |  |  |
| 4th |  | ④ | ⊙ | ○ | ○ | ○ | ○ |  |  |  |

TABLE 74

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | b | ② | ○ |  |  | ⊙ |  | ○ |  | △ | ○ |
| 3rd | c | ② | ○ | ○ | ⊙ | ○ |  | ○ |  |  |
| 4th |  | ① | ○ |  | ○ | ○ | ⊙ | ○ |  |  |

TABLE 75

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | b | ② | ○ |  |  | ⊙ |  | ○ |  | △ | ○ |
| 3rd | c | ② | ○ | ○ | ⊙ | ○ |  | ○ |  |  |
| 4th |  | ② | ○ |  | ○ | ⊙ | ○ | ○ |  |  |

TABLE 76

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | b | ② | ○ |  |  | ⊙ |  | ○ |  | △ | ○ |
| 3rd | c | ② | ○ |  | ○ | ⊙ | ○ |  | ○ |  |  |
| 4th |  | ③ | ○ | ⊙ | ○ | ○ | ○ |  |  |  |

TABLE 77

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | b | ② | ○ |  |  | ⊙ |  | ○ |  | △ | ○ |
| 3rd | c | ② | ○ | ○ | ⊙ | ○ |  | ○ |  |  |
| 4th |  | ④ | ⊙ | ○ | ○ | ○ | ○ |  |  |  |

TABLE 78

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | b | ② | ○ |  |  | ⊙ |  | ○ |  | △ | ○ |
| 3rd | c | ① | ○ |  | ○ | ⊙ |  | ○ |  |  |
| 4th |  | ③ | ○ |  | ○ | ○ | ○ |  |  |  |

TABLE 79

|  |  | Clutch Means | | | | | Brake Means | | | |
|---|---|---|---|---|---|---|---|---|---|---|
|  |  | K1 | K2 | K3 | K4 | K5 | B1 | B2 | B3 | B4 |
| 2nd | b | ② | ○ |  |  | ⊙ |  | ○ |  | △ | ○ |
| 3rd | c | ① | ○ |  | ○ | ⊙ |  | ○ |  |  |
| 4th |  | ② | ○ |  | ○ | ⊙ | ○ |  |  |  |

As could be seen from the aforementioned examples of the jumping shift, a plurality of speed stages including the auziliary speed stage are present between the present speed stage and the target speed stage. In case of this jumping shift, different speed stage are preferably passed for an upshift and a downshift.

For the upshift, more specifically, the aforementioned intermediate stage selection means 14 selects such one (i.e., a speed stage for a higher speed) of the selectable intermediate stages as has a smaller gear ratio. For the downshift, on the other hand, the intermediate stage selection means 14 selects such one (i.e., a speed stage for a lower speed) as has a higher gear ratio. The means other than this intermediate stage selection means 14 are similiar to those of the system shown in FIG. 27.

Figure 28:
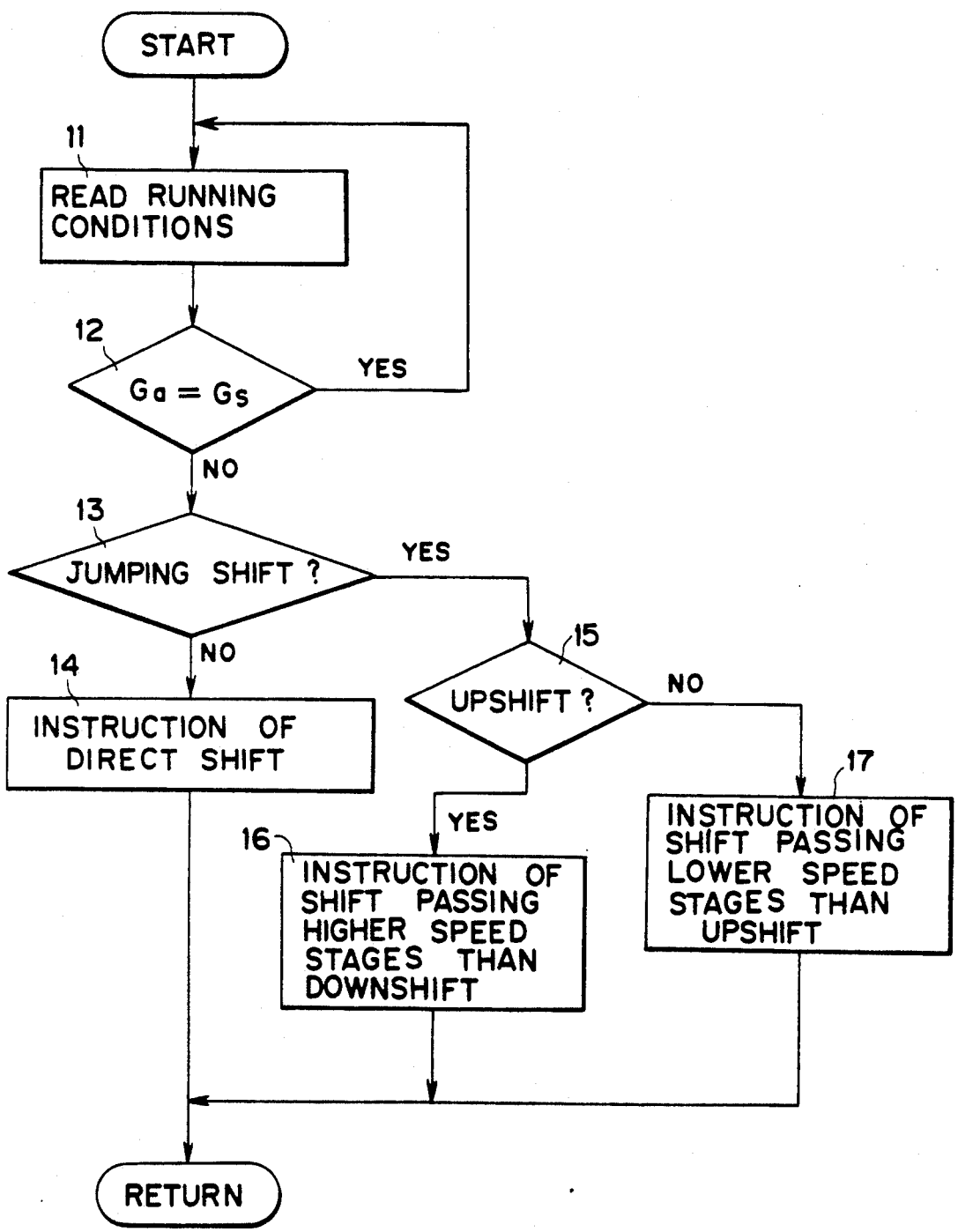
FIG. 28 is a flow chart for explaining a shift control to pass through different intermediate speed stages for an upshift and a downshift.

FIG. 28 is a flow chart for explaining a method for executing a control passing different intermediate stages for the upshift and the downshift.

At Step 11, the running conditions such as the vehicle speed V, the throttle opening θ and the speed stage are read in. Then, it is decided (at Step 12) whether or not the target speed stage Ga is identical to the present speed stage Gs. The routine is returned to upstream of the Step 11, if the decision result is "YES". If "NO", the routine advances to Step 13, at which it is decided whether or not the shift is the jumping one. If this decision result is "NO", a shift instruction signal for a direct shift to that target speed stage is outputted (at Step 14). If the decision result is "YES", it is decided (at Step 15) whether or not the shift is an upshift. If the result in this decision procedure is "YES", a shift instruction signal for passing a higher gear ratio than that of the downshift is outputted (at Step 16). If this decision result is "NO", on the contrary, a shift instruction signal for passing a lower gear ratio than that of the upshift is outputted (at Step 17).

The jumping shift thus far described in connection with the automatic transmission shown in FIG. 2 or 3 will be described more specifically in the following.

First of all, an example for a shift between the 1st and 5th speeds will be described. In case of the upshift, the 4th speed is passed to the 5th speed. In case of the downshift, the 3.5th speed and the 2.5th speed are passed in the recited order to the 1st speed. The engagement/release patterns for the individual speed stages for such shifts are tabulated in Table 80. In the following Tables, symbols Δ indicate that the corresponding members are engaged for control purposes although the intended speed stage could be set even if the members were released, whereas arrows indicate the shifting order.

TABLE 80

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| ↓ | 1st | a | ③ | ○ |  |  | ○ | Δ | ○ | ○ |  |
|  |  |  | ① | ○ |  |  | ○ | ○ | * | ○ |  |
|  | 4th | a | ④ | ○ | * | ○ | ○ | ○ |  |  |  |
|  |  |  | ④ | ○ | Δ | ○ | ○ | ○ |  |  |  |
|  |  |  | ① | * | ○ | ○ | ○ | Δ |  |  |  |
|  | 5th | a |  |  | ○ | ○ |  | Δ |  | ○ |  |
| ↓ | 3.5th |  |  | ○ |  | ○ |  |  |  | ○ |  |
|  | 2.5th |  | ① | ○ |  | ○ | ○ |  |  | ○ | * |
|  | 1st | a | ① | ○ |  |  | ○ | ○ | * | ○ |  |
|  |  |  | ③ | ○ |  |  | ○ | Δ | ○ | ○ |  |

At the 1st speed, the first, fourth and fifth clutch means K1, K4 and K5 and the first and second brake means B1 and B2 are engaged. From this status, the first brake means B1 and then the second brake means B2 are released, and the third clutch means K3 is engaged. As a result, the 4th speed is set according to the pattern ④ of the column a of the Table 80. Incidentally, this shift can be effected merely by switching the engagement/release statuses of the two frictional engagement means, i.e., the third clutch means K3 and the second brake means B2 so that the socalled "simultaneous shift" is not invited to keep the shift shocks away from any deterioration and to facilitate the shift control. After the shift to the 4th speed, moreover, the second clutch means K2 is engaged, and the first clutch means K1 is then released to change the pattern to that of the column a of the Table 80. Then, the fourth clutch means K4 is released, but the third brake means B3 is engaged to set the 5th speed according to the pattern of the column a.

Thus, the upshift to the 5th speed is executed without passing the simultaneous shift, and the speed stage to be passed is the fourth one having a gear ratio approximate to that of the 5th speed, i.e., the target speed stage. As a result, the feel to be received by the driver well matches that to be received when the intended shift is executed.

In case of a downshift from the 5th to 1st speeds, on the other hand, the second clutch means K2 is released whereas the first clutch means K1 is engaged to set the 3.5th speed at first, while the 5th speed is set in the pattern on the column a, as described above. Then, the third clutch means K3 is released whereas the fourth clutch means K4 is engaged to set the 2.5th speed according to the pattern ① of the Table 80. From this status of the 2.5th speed, moreover, the third brake means B3 is released whereas the second brake means B2 is engaged to set the 1st speed according to the pattern ①, which is changed to the pattern ③ by engaging the first brake means B1.

As a result, the downshift from the 5th to 1st speeds can be executed without effecting the simultaneous shift, and the intermediate speed stages to be passed are the 3.5th speed and the 2.5th speed. Since these speeds have higher gear ratios than that of the 4th speed to be passed in case of the upshift, the torque is rapidly augmented to provide shifts matching the requirements of the driver.

The shifts between the 2nd and 5th speeds follow the following Table 81.

TABLE 81

|  |  |  | Clutch Means |  |  |  |  | Brake Means |  |  |  |
|---|---|---|---|---|---|---|---|---|---|---|---|
|  |  |  | K1 | K2 | K3 | K4 | K5 | B1 | B2 | B3 | B4 |
| ↓ | 2nd | a | ② | ○ | ○ |  | ○ | * | ○ |  | * |
|  | 3.2th |  |  | ○ | ○ |  | ○ |  | ○ |  |  |
|  | 3.5th |  |  | ○ |  | ○ | ○ |  | ○ |  |  |
|  | 5th | a |  |  | ○ | ○ | Δ |  | ○ |  |  |
| ↓ | 3.5th |  |  | ○ |  | ○ | ○ |  | ○ |  |  |
|  | 2.5th |  | ① | ○ |  | ○ | ○ |  | ○ |  | * |
|  | 2nd | b | ① | ○ |  |  | ○ | ○ | ○ |  | * |

If the 2nd speed is set according to the pattern of the column a of the Table 81 in case of an upshift from the 2nd to 5th speeds, the 3.2th speed and then the 3.5th speed are passed to set the 5th speed according to the pattern of the column a. In case of this upshift, the shift from the 2nd to the 3.2th speeds is achieved by releasing the second brake means B2 and engaging the third brake means B3. On the other hand, the shift from the 3.2th to 3.5th speeds is achieved by releasing the second clutch means K2 and the third clutch means K3. Moreover, the shift from the 3.5th speed to the 5th speeds is achieved by releasing the first clutch means K1 and engaging the second clutch means K2. As a result, in case of any of the shifts, the number of the frictional engagement means to have their engagement/release statuses switched is two so that the so-called "simultaneous shift" is not caused.

In case of the downshift, on the other hand, the 5th speed is set by engaging the second clutch means K2, the third clutch means K3, the fifth clutch means K5 and the third brake means B3. From this status, the shift is carried out to the 2.5th speed and then to the 2nd speed, which is set according to the pattern of the column b of the Table 81. As a result, the shift from the 5th to 3.5th speeds is achieved by engaging the first clutch means K1 and releasing the second clutch means K2. On the other hand, the shift from the 3.5th to 2.5th speeds is achieved by releasing the third clutch means K3 and engaging the fourth clutch means K4. Moreover, the shift from the 2.5th to 1st speeds is achieved by releasing the fifth clutch means K5 and engaging the first clutch means B1. Thus, any of the shifts is freed from the simultaneous shift.

If, moreover, the shift control is executed according to the Table 81, the speed stages to be passed for the upshifts are the 3.2th and 3.5th speeds, which have lower gear ratios than those of the 3.5th and 2.5th speeds to be passed in case of the downshifts. As a result, the shifts are executed to match the accelerator controls of the driver such that not the vehicle speed but the number of revolutions of the engine is rapidly dropped in case of the upshifts whereas the torque is rapidly augmented in case of the downshifts.

In case the 2nd speed is set according to the pattern ① of the column b of the Table 81, the shifts between itself and the 5th speed may be carried out to pass the intermediate speed stages, as enumerated in Table 82.

TABLE 82

|   |   |   | Clutch Means | | | | | Brake Means | | | |
|---|---|---|---|---|---|---|---|---|---|---|---|
|   |   |   | K1 | K2 | K3 | K4 | K5 | B1 | B2 | B3 | B4 |
| ↓ | 2nd | b | ① | ○ |   | ○ |   | ○ | ○ |   | * |
|   | 3rd | b |   | ○ | ○ |   |   | ○ | * |   |   |
|   | 3.5th |   |   | ○ | ○ |   | ○ |   | ○ |   |   |
|   | 5th | a |   |   | ○ | ○ |   | * |   | ○ |   |
| ↓ | 3.5th |   |   |   | ○ | ○ |   |   | ○ | ○ |   |
|   | 2.5th |   | ① | ○ |   | ○ | ○ |   |   | ○ | * |
|   | 2nd | b | ① | ○ |   |   | ○ | ○ |   | ○ | * |

In this case, too, the speed stages to be passed for an upshift have lower gear ratios than those of the speed stages to be passed for a downshift. No matter whether the shift might be the upshift or the downshift, therefore, the vehicle speed, the torque and the number of engine revolutions are changed to meet the requirements of the driver so that any shift to be established can be freed from any physical disorder such as its delay.

Incidentally, the examples thus far described are directed to the shifts to and from the 5th speed. Despite of this fact, however, the shifts between the 2nd and 4th speeds can also be achieved, like the foregoing examples, to pass different intermediate speed stages for the upshift and downshift. In the automatic transmission having the structure shown in FIG. 2, intermediate stages such as the 2.5th speed or the 3.5th speed are present in addition to the 3rd speed between the 2nd and 4th speeds so that the shifts between these 2nd and 4th speeds are substantially effected between the speed stages apart by three steps or more. In this case, moreover, the upshift is effected to pass the 2.7th speed whereas the downshift is effected to pass the 2.5th speed, as enumerated in Table 83.

TABLE 83

|   |   |   | Clutch Means | | | | | Brake Means | | | |
|---|---|---|---|---|---|---|---|---|---|---|---|
|   |   |   | K1 | K2 | K3 | K4 | K5 | B1 | B2 | B3 | B4 |
| ↓ | 2nd | b | ① | ○ |   | ○ |   | ○ | ○ |   | * |
|   | 2.7th |   |   | ○ | ○ |   | ○ |   | ○ |   |   |
|   | 4th | a | ④ | ○ | * | ○ | ○ | ○ |   |   |   |
| ↓ | 2.5th |   | ① | ○ |   |   | ○ | ○ |   | ○ | * |
|   | 2nd | b | ① | ○ |   | ○ |   | ○ |   | ○ | * |

In case the automatic transmission shown in FIG. 6 is to be shifted to another speed stage apart by three steps or more, the speed stages and the engagement/release patterns are changed, as enumerated in Tables 84 to 86.

TABLE 84

|   |   |   | Clutch Means | | | | Brake Means | | |
|---|---|---|---|---|---|---|---|---|---|
|   |   |   | K1 | K2 | K3 | K4 | B2 | B3 | B4 |
| ↓ | 1st |   |   | ○ |   | ○ | ○ |   |   |
|   | 4th |   | ② | ○ | ○ | * | ○ |   |   |
|   |   |   | ④ | * | ○ | ○ | ○ |   |   |
|   | 5th |   |   |   | ○ | ○ |   | ○ |   |
| ↓ | 3.5th |   |   | ○ | ○ |   |   | ○ |   |
|   | 2.5th |   | ① | ○ |   | ○ |   | ○ | * |
|   | 1st |   |   | ○ |   |   | ○ | ○ |   |

TABLE 85

|   |   |   | Clutch Means | | | | Brake Means | | |
|---|---|---|---|---|---|---|---|---|---|
|   |   |   | K1 | K2 | K3 | K4 | B2 | B3 | B4 |
| ↓ | 1st |   |   | ○ |   | ○ | ○ |   |   |
|   | 3rd |   |   | ○ | ○ |   | ○ |   |   |
|   | 4th |   | ① | ○ | ○ | ○ | * |   | * |
| ↓ | 2nd |   | ① | ○ | ○ |   |   | ○ |   |
|   | 1st |   |   | ○ |   |   | ○ | ○ |   |

TABLE 86

|   |   |   | Clutch Means | | | | Brake Means | | |
|---|---|---|---|---|---|---|---|---|---|
|   |   |   | K1 | K2 | K3 | K4 | B2 | B3 | B4 |
| ↓ | 3rd· |   |   | ○ |   | ○ |   | ○ |   |
|   | 4th |   | ① | ○ | ○ | ○ | * |   |   |
|   | 5th |   |   |   | ○ | ○ |   | ○ |   |
| ↓ | 3.5th |   |   | ○ | ○ |   |   | ○ |   |
|   | 3rd |   |   | ○ |   | ○ |   | ○ |   |

Specifically, the Table 84 presents an example of the case of shifts between the 1st and 5th speeds. The 4th speed is temporarily set for an upshift, and the 3.5th speed and the 2.5th speed are temporarily set in the recited order for a downshift. Incidentally, the patterns ② and ④ are selected in this order as the engagement/release pattern for setting the 4th speed, and pattern ① is selected as that for setting the 2.5th speed.

The Table 85 presents an example of the case of shifts between the 1st and 4th speeds. The 3rd speed is temporarily set for an upshift, and the 2nd speed is temporarily set for a downshift. Incidentally, the 4th speed is set according to the pattern ①, and the 2nd is set according to the pattern ①.

The Table 86 presents an example of the case of shifts between the 3rd and 5th speeds. Since the 3.2th, 3.5th and 4th speeds are present inbetween, the shift is effected by jumping three or more steps. In this case, more specifically, the upshift is carried out by passing the 4th speed whereas the downshift is carried out by setting the 3.5th speed temporarily. Incidentally, the pattern ① is selected as the engagement/release pattern for setting the 4th speed.

As a result, in case of any of the aforementioned jumping shifts, the upshift has a rapid decrease in the gear ratio although it passes intermediate speed stages, and the downshift has a rapid increase in the gear ratio. In either case, moreover, the simultaneous shift is avoided.

The clutch and brake application charts of the case, in which the jumping shifts are to be executed for the automatic transmissions equipped with the gear trains shown in FIGS. 12 to 14, are enumerated in Tables 87 and 88.

TABLE 87

|   |     |   | Clutch Means |    |    |    |    | Brake Means |    |    |    |
|---|-----|---|----|----|----|----|----|----|----|----|----|
|   |     |   | K1 | K2 | K3 | K4 | K5 | B1 | B2 | B3 | B4 |
| ↓ | 2nd | b | ① | O  |    | O  |    | O  | O  |    | •  |
|   | 3rd | c | ② | O  | O  | O  |    | O  |    |    |    |
|   | 4th |   | ② | O  | *  | O  | O  |    |    |    |    |
|   |     |   | ③ | O  | *  | O  | O  |    |    |    |    |
| ↓ | 2.5th |  | ① | O  |    | O  | O  |    | O  |    | •  |
|   | 2nd | b | ① | O  |    | O  |    | O  | O  |    | •  |

TABLE 88

|   |       |   | Clutch Means |    |    |    |    | Brake Means |    |    |    |
|---|-------|---|----|----|----|----|----|----|----|----|----|
|   |       |   | K1 | K2 | K3 | K4 | K5 | B1 | B2 | B3 | B4 |
| ↓ | 2nd   | b | ① | O  |    | O  |    | O  | O  |    | •  |
|   | 3rd   | b |   | O  |    | O  |    | O  | △  |    |    |
|   | 4.5th |   |   |    | O  | O  |    | O  |    | O  |    |
|   | 5th   |   |   |    | O  | O  |    |    | O  | O  |    |
| ↓ | 3.5th |   |   | O  |    | O  |    |    | O  | O  |    |
|   | 2.5th |   | ① | O  |    | O  | O  |    |    | O  | •  |
|   | 2.2th |   |   | O  | O  |    |    | O  |    | O  |    |
|   | 2nd   | b | ① | O  |    | O  |    | O  | O  |    | •  |

In case of shifts between the 2nd and 4th speeds, more specifically, the 2nd speed is set according to the pattern ① of the column b of the foregoing Table 26, as tabulated in the Table 87. After the 3rd speed has been temporarily set according to the pattern ② of the column c, the upshift is executed by setting the 4th speed in accordance with the pattern ② or ③. On the other hand, the downshift to the 2nd speed is executed by setting the 4th speed in accordance with the pattern ② or ③ and by subsequently setting the 2nd speed by way of the 2.5th speed in accordance with the pattern ① of the column b.

On the other hand, the Table 88 presents an example of the shifts between the 2nd and 5th speeds. The upshift is executed by setting the 2nd speed in accordance with the pattern ① of the column b and by subsequently setting the 4th speed via the 3rd and 4.5th speeds in this order. On the other hand, the downshift is executed by setting the 2nd speed in accordance with the pattern ① of the column b via the 3.5th and 2.5th speeds in this order. Here, the 3rd speed for the upshift is set according to the pattern of the column b whereas the 2.5th speed for the downshift is set according to the pattern ①.

As a result, even in either of the cases enumerated in Tables 87 and 88, the gear ratios of the speed stages to be passed for the upshift are lower than those of the speed stages to be passed for the downshift. No matter whether the shifts might be the upshift or the downshift, therefore, they can be executed to match the feel of the driver while avoiding the simultaneous shift.

Although the present invention has been described by taking up those several examples, the automatic transmissions, to which the present invention can be applied, should not be limited to those having the aforementioned gear trains but can be applied to the automatic transmissions having the gear trains which have been proposed by us in Japanese Patent Applications Nos. Hei 1-185151, Hei 1-185152, Hei 1-186991, Hei 1-186992, Hei 1-205478 and Hei 1-280957.

As has been apparent from the description thus far made, according to the automatic transmission of the present invention, upshifts can be executed more rapidly to speed stages having lower torque amplifications. For downshifts, on the other hand, the shifts can be changed more rapidly to speed stages having higher torque amlifications. Thus, it is possible to effect the shifts desired by the driver, i.e., the shifts in quick response to the accelerator controls of the driver.

What is claimed is:

1. An automatic transmission for a vehicle, comprising:
   a gear train comprising a plurality of planetary gear sets each having rotary members;
   a plurality of frictional engagement means for setting a plurality of main speed stages through which drive force is transmitted during running of the vehicle, and auxiliary speed stages having a gear ratio of an intermediate value between those of said main speed stages, which are not selected based on the engine load, by connecting or stopping the rotary members of said planetary gear sets to change the transmission path of the drive force through said gear train;
   hydraulic control means for changing the engagement/release statuses of said frictional engagement means;
   shift decision means for deciding a shift from one of said main speed stages to another main speed stage;
   auxiliary speed stage selection means for selecting at least one auxiliary speed stage between said main speed stages; and
   output means for outputting an instruction signal to said hydraulic control means as to shift from said one main speed stage to said another main speed stage and so as to set said at least one auxiliary speed stage temporarily at the time of the shift between said main speed stages, wherein said at least one auxiliary speed stage is selected such that the revolving, direction of the rotary members of said planetary gear sets is not reversed during the shift between said main speed stages.

2. An automatic transmission according to claim 1, wherein said auxiliary speed stage selection means comprises means for selecting an auxiliary speed stage wherein the number of the frictional engagement means whose engagement/release statuses are switched substantially simultaneously at the time of a shift from the one of the main speed stages to another main speed stage are minimized.

3. An automatic transmission according to claim 1, wherein said auxiliary speed stage selection means selects a plurality of auxiliary speed stages.

4. An automatic transmission according to claim 1, further comprising engagement/release pattern selection means for changing the engagement/release combination of said frictional engagement means for setting the one of the main speed stages prior to the shift from the one of the main speed stages to the auxiliary speed stage.

5. An automatic transmission according to claim 1, further comprising engagement/release pattern selection means for changing the engagement/release combination of said frictional engagement means into another combination of an unchanged gear ratio while said auxiliary speed stage is set.

6. An automatic transmission according to claim 1, wherein said auxiliary speed stage selection means selects such an auxiliary speed stage as can minimize the cumulative number of fluctuating revolutions of the rotary members of said planetary gear sets for the shift from the one of the main speed stages to another main speed stage.

7. An automatic transmission according to claim 6, wherein said auxiliary speed stage selection means selects a plurality of auxiliary speed stages.

8. An automatic transmission according to claim 6, wherein said auxiliary speed stage selection means selects such an auxiliary speed stage as can minimize the number of the frictional engagement means, the engagement/release statuses of which are to be switched substantially simultaneously at the time of a shift from said predetermined main speed stage to another main.

9. An automatic transmission according to claim 3, wherein said auxiliary speed stage selection means selects different auxiliary speed stages in case the shift between said main speed stages is an upshift or downshift.

10. An automatic transmission according to claim 9, wherein said auxiliary speed stage selection means selects an auxiliary speed stage of a low gear ratio, in case the shift between said main speed stages is an upshift, and an auxiliary speed stage of a high gear ratio in case the shift between said main speed stages is a downshift.

11. An automatic transmission according to claim 1, wherein said gear train comprises:
an input shaft;
an output shaft;
a first planetary gear set comprising a first sun gear, a first ring gear, a first pinion gear meshing with said first sun gear and said first ring gear, and a first carrier supporting said first pinion gear;
a second planetary gear set comprising a second sun gear connected integrally or selectively to said first sun gear, a second ring gear, a second pinion gear meshing with said second sun gear and said second ring gear, and a second carrier supporting said second pinion gear; and
a third planetary gear set comprising a third sun gear connected integrally or selectively to said second carrier, a third ring gear connected integrally or selectively to said first carrier, a third pinion gear meshing with said third sun gear and said third ring gear, and a third carrier supporting said third pinion gear and connected integrally or selectively to said second ring gear.

12. An automatic transmission according to claim 11, wherein said frictional engagement means comprises:
first clutch means for connecting said input shaft and said first ring gear selectively;
second clutch means for connecting said first sun gear and said second carrier selectively;
third clutch means for connecting said input shaft and said first sun gear selectively;
fourth clutch means for connecting said first sun gear and said second sun gear selectively;
first brake means for stopping the revolutions of said second carrier selectively; and
second brake means for stopping the revolutions of said second sun gear selectively, and
wherein said output shaft is connected to said second ring gear and said third carrier.

13. An automatic transmission according to claim 1, wherein said gear train comprises:
an input shaft;
an output shaft;
a first planetary gear set comprising a first sun gear, a first ring gear, a first pinion gear meshing with said first sun gear and said first ring gear, and a first carrier supporting said first pinion gear;
a second planetary gear set comprising a second sun gear connected integrally or selectively to said first sun gear, a second ring gear connected integrally or selectively to said first carrier, a second pinion gear meshing with said second sun gear and said second ring gear, and a second carrier supporting said second pinion gear; and
a third planetary gear set comprising a third sun gear connected integrally or selectively to said second carrier, a third ring gear connected integrally or selectively to said second ring gear, a third pinion gear meshing with said third sun gear and said third ring gear, and a third carrier supporting said third pinion gear.

14. An automatic transmission according to claim 11, wherein said frictional engagement means comprises:
first clutch means for connecting said input shaft and said first ring gear selectively;
third clutch means for connecting said input shaft and said first sun gear selectively;
fifth clutch means for connecting said second carrier and said third sun gear selectively;
second brake means for stopping the revolutions of said second sun gear selectively; and
third brake means for stopping the revolutions of said third sun gear selectively, and
wherein said output shaft is connected to said third carrier.

15. An automatic transmission according to claim 14, wherein said frictional engagement means further comprises:
first brake means for stopping the revolutions of said second carrier selectively.

16. An automatic transmission according to claim 15, wherein said frictional engagement means further comprises:
second clutch means for connecting said first sun gear and said second carrier selectively; and
fourth clutch means for connecting said first sun gear and said fourth carrier selectively.

17. An automatic transmission according to claim 16, wherein said frictional engagement means further comprises:
fourth brake means for stopping the revolutions of said first sun gear selectively.

18. An automatic transmission comprising:
a gear train comprising a plurality of planetary gear sets each having rotary members;
a plurality of frictional engagement means for setting a plurality of speed stages by either connecting the rotary members of said planetary gear sets or stopping the revolutions of said rotary members to change the transmission path of a drive force through said gear train;

hydraulic control means for changing the engagement/release statuses of said frictional engagement means;

shift decision means for deciding a shift from one of said speed stages to another;

intermediate stage selection means for selecting an intermediate speed stage between said plurality of speed stages, in which the one of the speed stages and another are apart two or more stages from each other, based upon consideration of the number of said frictional engagement means and the number of fluctuating revolutions of the rotary members of the planetary gearsets which changes the engagement/release statuses substantially simultaneously; and output means for outputting an instruction signal to said hydraulic control means as to set said intermediate speed stage temporarily at the time of the shift between said plurality of speed stages.

19. An automatic transmission according to claim 18, further comprising engagement/release pattern selection means for changing the engagement/release combination of said frictional engagement means for setting the one of the speed stages prior to the shift from the one of the speed stages to the intermediate speed stage.

20. An automatic transmission according to claim 18, further comprising engagement/release pattern selection means for changing the engagement/release combination of said frictional engagement means into another combination of an unchanged gear ratio while said intermediate speed stage is set.

21. An automatic transmission for a vehicle comprising:

a gear train comprising a plurality of planetary gear sets each having rotary members;

a plurality of frictional engagement means for setting a plurality of speed stages by either connecting or stopping the rotary members of said planetary gear sets to change the transmission path of a drive force through said gear train;

hydraulic control means for changing the engagement/release statuses of said frictional engagement means;

shift decision means for deciding a shift from one of said speed stages to a target speed stage which is apart three or more stages from said one of the speed stages;

intermediate stage selection means for selecting an intermediate speed stage of a lower gear ratio between said one of the speed stages and the target speed stage, in case a shift is an upshift, and an intermediate speed stage of a higher gear ratio between said one of the speed stages and the target speed stage in case said shift is a downshift; and output means for outputting an instruction signal to said hydraulic control means as to set said intermediate speed stage temporarily at the time of the shift between said plurality of speed stages.

* * * * *

UNITED STATES PATENT AND TRADEMARK OFFICE
CERTIFICATE OF CORRECTION

PATENT NO. : 5,203,234

DATED : April 20, 1993

INVENTOR(S) : TOSHIYUKI ASADA ET AL.

It is certified that error appears in the above-identified patent and that said Letters Patent is hereby corrected as shown below:

Column 41, line 13, change "gearsets" to —gear sets—.

Signed and Sealed this

Fifteenth Day of February, 1994

Attest:

BRUCE LEHMAN

Attesting Officer

Commissioner of Patents and Trademarks